United States Patent
Yamagami

(10) Patent No.: US 8,238,039 B2
(45) Date of Patent: Aug. 7, 2012

(54) VARIABLE POWER OPTICAL SYSTEM, OPTICAL APPARATUS EQUIPPED WITH THE VARIABLE POWER OPTICAL SYSTEM, AND METHOD FOR MANUFACTURING VARIABLE POWER OPTICAL SYSTEM

(75) Inventor: Akira Yamagami, Kawasaki (JP)

(73) Assignee: Nikon Corporation, Tokyo (JP)

( * ) Notice: Subject to any disclaimer, the term of this patent is extended or adjusted under 35 U.S.C. 154(b) by 85 days.

(21) Appl. No.: 12/866,258

(22) PCT Filed: Apr. 14, 2009

(86) PCT No.: PCT/JP2009/057504
§ 371 (c)(1),
(2), (4) Date: Aug. 5, 2010

(87) PCT Pub. No.: WO2009/139253
PCT Pub. Date: Nov. 19, 2009

(65) Prior Publication Data
US 2010/0321792 A1    Dec. 23, 2010

(30) Foreign Application Priority Data

| May 11, 2008 | (JP) | 2008-124109 |
| May 11, 2008 | (JP) | 2008-124110 |
| Aug. 28, 2008 | (JP) | 2008-219031 |
| Aug. 28, 2008 | (JP) | 2008-219032 |

(51) Int. Cl.
*G02B 15/14* (2006.01)
*G02B 27/64* (2006.01)

(52) U.S. Cl. ............ 359/687; 359/554; 359/557

(58) Field of Classification Search ........... 359/676, 359/683, 687, 554, 557
See application file for complete search history.

(56) References Cited

U.S. PATENT DOCUMENTS

| 5,134,524 A | 7/1992 | Hamano et al. |
| 6,414,800 B1 * | 7/2002 | Hamano ............. 359/687 |
| 7,253,965 B2 | 8/2007 | Shibayama et al. |

(Continued)

FOREIGN PATENT DOCUMENTS

JP    03-012619 A    1/1991
(Continued)

OTHER PUBLICATIONS

Extended European Search Report (with search opinion) from European Patent Application No. 0974 6460.

*Primary Examiner* — Scott J Sugarman
(74) *Attorney, Agent, or Firm* — Miles & Stockbridge P.C.

(57) ABSTRACT

A variable power optical system ZL is constructed of, in order from the object side, a first lens unit G1 having a positive refractive power, a second lens unit G2 having a negative refractive power, a third lens unit G3 having a positive refractive power, and a fourth lens unit G4 having a positive refractive power. During variation in power from a wide-angle end state to a telephoto end state, a space between the first lens unit G1 and the second lens unit G2 increases, a space between the second lens unit G2 and the third lens unit G3 decreases, and a space between the third lens unit G3 and the fourth lens unit G4 varies, and a part of the third lens unit G3 is configured to move in directions perpendicular to the optical axis.

14 Claims, 26 Drawing Sheets

U.S. PATENT DOCUMENTS

| | | |
|---|---|---|
| 7,420,745 B2 | 9/2008 | Ohashi |
| 7,457,046 B2 | 11/2008 | Hamano et al. |
| 2002/0089762 A1 | 7/2002 | Hoshi |
| 2003/0117717 A1 | 6/2003 | Ohtake et al. |
| 2006/0291070 A1 | 12/2006 | Terada et al. |
| 2007/0091461 A1 | 4/2007 | Saori |
| 2008/0019018 A1 | 1/2008 | Ito |
| 2009/0251797 A1* | 10/2009 | Saruwatari .................... 359/687 |

FOREIGN PATENT DOCUMENTS

| | | |
|---|---|---|
| JP | 03-012620 A | 1/1991 |
| JP | 03-012622 A | 1/1991 |
| JP | 04-014006 A | 1/1992 |
| JP | 04-014007 A | 1/1992 |
| JP | 2000-249900 A | 9/2000 |
| JP | 2003-140048 A | 5/2003 |
| JP | 2003-177317 A | 6/2003 |
| JP | 2005-024844 A | 1/2005 |
| JP | 2005-345970 A | 12/2005 |
| JP | 2006-010619 A | 1/2006 |
| JP | 2006-106111 A | 4/2006 |
| JP | 2006-106191 A | 4/2006 |
| JP | 2006-308957 A | 11/2006 |
| JP | 2007-010695 A | 1/2007 |

* cited by examiner

VARIABLE POWER OPTICAL SYSTEM, OPTICAL APPARATUS EQUIPPED WITH THE VARIABLE POWER OPTICAL SYSTEM, AND METHOD FOR MANUFACTURING VARIABLE POWER OPTICAL SYSTEM

TECHNICAL FIELD

The present invention relates to a variable power optical system, an optical apparatus equipped with the variable power optical system, and a method for manufacturing the variable power optical system.

BACKGROUND ART

There are the hitherto-proposed variable power optical systems with an antivibration function. (For example, reference is made to Patent Document 1.)
Patent Document 1: Japanese Patent Application Laid-open No. 2006-106191

DISCLOSURE OF THE INVENTION

Problem to be Solved by the Invention

There are, however, desires for better optical performance than those of the conventional variable power optical systems.
The present invention has been accomplished in view of the above problem and it is an object of the present invention to provide a variable power optical system capable of achieving excellent optical performance, an optical apparatus equipped with the variable power optical system, and a method for manufacturing the variable power optical system.

Means for Solving the Problem

In order to solve the above problem, a variable power optical system according to the present invention comprises, in order from the object side, a first lens unit having a positive refractive power, a second lens unit having a negative refractive power, a third lens unit having a positive refractive power, and a fourth lens unit having a positive refractive power; during variation in power from a wide-angle end state to a telephoto end state, a space between the first lens unit and the second lens unit increases, a space between the second lens unit and the third lens unit decreases, and a space between the third lens unit and the fourth lens unit varies; a part of the third lens unit is configured to move in directions perpendicular to the optical axis. The variable power optical system is configured to satisfy conditions of the following expressions:

$$0.25 < (Lw \cdot fw)/(\Delta d1 \cdot ft) < 0.55;$$

$$2.20 < f3/fw < 4.50,$$

where fw is a focal length of the entire system in the wide-angle end state, ft a focal length of the entire system in the telephoto end state, f3 a focal length of the third lens unit, $\Delta d1$ an axial moving distance of the first lens unit during change in a lens position state from the wide-angle end state to the telephoto end state, and Lw an overall length in the wide-angle end state.

This variable power optical system may be configured to satisfy a condition of the following expression:

$$0.42 < (Lw \cdot fw)/(\Delta d3 \cdot ft) < 0.90,$$

where $\Delta d3$ is an axial moving distance of the third lens unit during the variation in power from the wide-angle end state to the telephoto end state.

The variable power optical system may be configured as follows: the third lens unit comprises, in order from the object side, a 3a lens unit having a positive refractive power and a 3b lens unit having a negative refractive power; the 3b lens unit is configured to move in directions perpendicular to the optical axis.

The variable power optical system may be configured to satisfy a condition of the following expression:

$$3.50 < f1/fw < 8.00,$$

where f1 is a focal length of the first lens unit.

The variable power optical system may be configured as follows: during the change in the lens position state from the wide-angle end state to the telephoto end state, the third lens unit and the fourth lens unit move toward an object.

The variable power optical system may be configured as follows: during the change in the lens position state from the wide-angle end state to the telephoto end state, the first lens unit moves toward an object.

The variable power optical system may be configured to satisfy a condition of the following expression:

$$0.30 < f3/ft < 1.00,$$

where f3 is the focal length of the third lens unit and ft the focal length of the entire system in the telephoto end state.

The variable power optical system may be configured so that the space between the third lens unit and the fourth lens unit in the wide-angle end state becomes larger than the space between the third lens unit and the fourth lens unit in the telephoto end state.

The variable power optical system may be configured to satisfy conditions of the following expressions:

$$0.80 < f3/f4 < 1.60;$$

$$1.90 \leq Bfw/fw < 3.00,$$

where f4 is a focal length of the fourth lens unit and Bfw a back focus in the wide-angle end state.

The variable power optical system may be configured as follows: the 3b lens unit is composed of, in order from the object side, a cemented lens in which a biconcave lens and a positive meniscus lens with a convex surface on the object side are cemented together.

The variable power optical system may be configured as follows: a lens surface nearest to the object in the 3b lens unit is formed in an aspherical shape.

An optical apparatus according to the present invention comprises the above-described variable power optical system.

In order to solve the above problem, another variable power optical system according to the present invention is a variable power optical system comprising, in order from the object side: a first lens unit having a positive refractive power; a second lens unit having a negative refractive power; a third lens unit having a positive refractive power; and a fourth lens unit having a positive refractive power, wherein during variation in power from a wide-angle end state to a telephoto end state, a space between the first lens unit and the second lens unit increases, a space between the second lens unit and the third lens unit decreases, and a space between the third lens unit and the fourth lens unit varies, wherein a part of the third lens unit is configured to move in directions perpendicular to the optical axis, the variable power optical system being configured to satisfy conditions of the following expressions:

$0.15 < (Lw \cdot fw)/(\Delta d1 \cdot ft) < 0.58;$ $0.42 < (Lw \cdot fw)/(\Delta d3 \cdot ft) < 0.90;$ $2.20 < f3/fw < 4.50,$ where fw is a focal length of the entire system in the wide-angle end state, ft a focal length of the entire system in the telephoto end state, f3 a focal length of the third lens unit, $\Delta d1$ an axial moving distance of the first lens unit during change in a lens position state from the wide-angle end state to the telephoto end state, $\Delta d3$ an axial moving distance of the third lens unit during the change in the lens position state from the wide-angle end state to the telephoto end state, and Lw an overall length in the wide-angle end state.

A method for manufacturing a variable power optical system according to the present invention is a method comprising: a step of arranging, in order from the object side, a first lens unit having a positive refractive power, a second lens unit having a negative refractive power, a third lens unit having a positive refractive power, and a fourth lens unit having a positive refractive power so that a part of the third lens unit moves in directions perpendicular to the optical axis; and a step of increasing a space between the first lens unit and the second lens unit, decreasing a space between the second lens unit and the third lens unit, and varying a space between the third lens unit and the fourth lens unit, thereby implementing variation in power from a wide-angle end state to a telephoto end state, the variable power optical system satisfying conditions of the following expressions:

$0.25 < (Lw \cdot fw)/(\Delta d1 \cdot ft) < 0.55;$ $2.20 < f3/fw < 4.50,$ where fw is a focal length of the entire system in the wide-angle end state, ft a focal length of the entire system in the telephoto end state, f3 a focal length of the third lens unit, $\Delta d1$ an axial moving distance of the first lens unit during change in a lens position state from the wide-angle end state to the telephoto end state, and Lw an overall length in the wide-angle end state.

EFFECT OF THE INVENTION

As the variable power optical system according to the present invention, the optical apparatus equipped with the variable power optical system, and the manufacturing method of the variable power optical system are configured as described above, they are able to achieve excellent optical performance.

LIST OF REFERENCE SYMBOLS

ZL (ZL1-ZL6) variable power optical system; G1 first lens unit; G2 second lens unit; G3 third lens unit; G3a 3a lens unit; G3b 3b lens unit; G4 fourth lens unit; 1 digital single-lens reflex camera (optical apparatus).

BEST MODES FOR CARRYING OUT THE INVENTION

Figure 1:
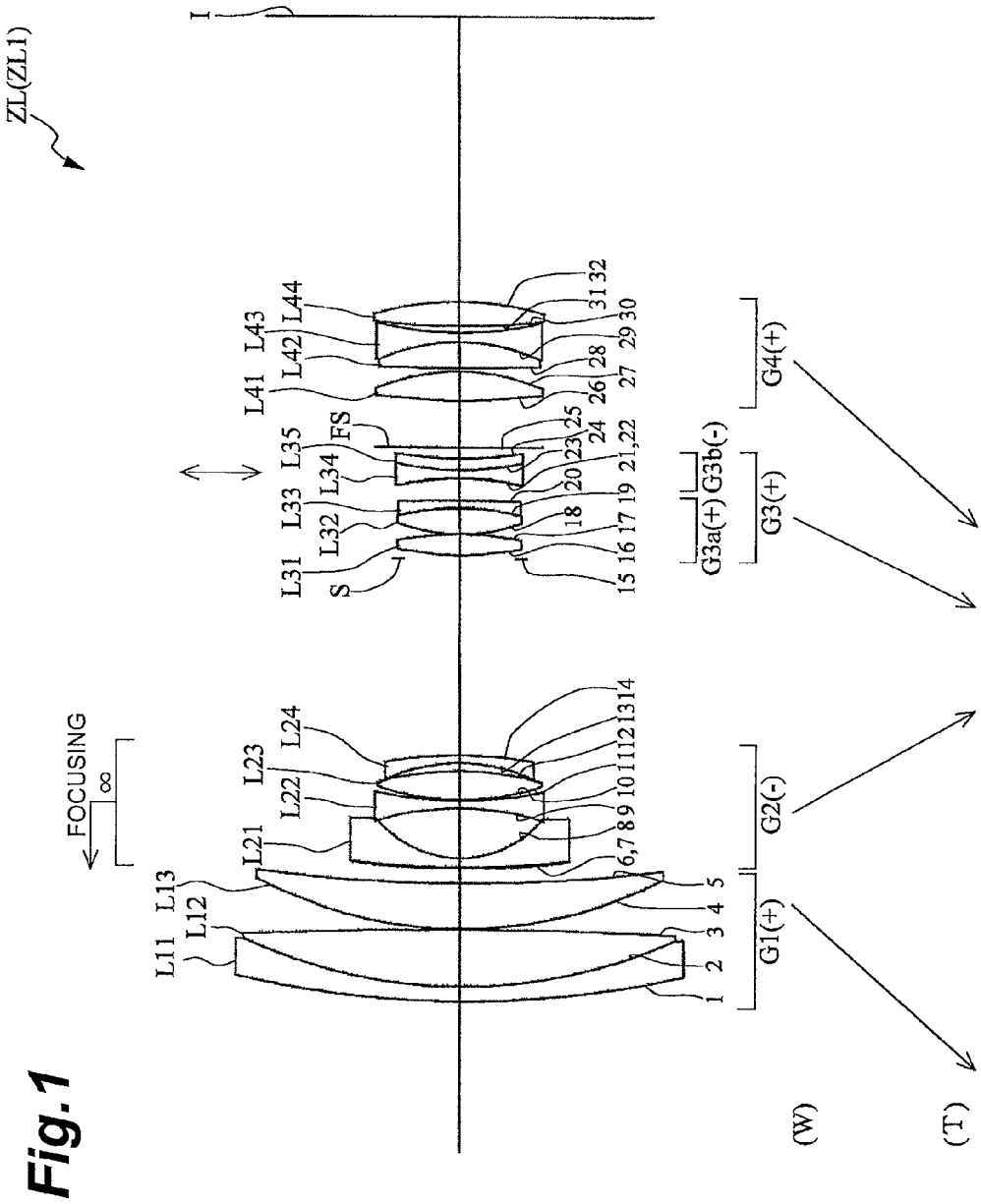
FIG. 1 is a sectional view showing a configuration of a variable power optical system according to the first example.

The preferred embodiments of the present invention will be described below with reference to the drawings. In the present specification, the wide-angle end state and the telephoto end state are those in an infinity in-focus state unless otherwise stated in particular. As shown in FIG. 1, the present variable power optical system ZL is composed of, in order from the object side, a first lens unit G1 having a positive refractive power, a second lens unit G2 having a negative refractive power, a third lens unit G3 having a positive refractive power, and a fourth lens unit G4 having a positive refractive power. During change in the lens position state from the wide-angle end state to the telephoto end state, a space between the first lens unit G1 and the second lens unit G2 increases, a space between the second lens unit G2 and the third lens unit G3 decreases, and a space between the third lens unit G3 and the fourth lens unit G4 varies; and a part of the third lens unit G3 is configured to move in directions perpendicular to the optical axis.

In the present variable power optical system ZL, the third lens unit G3 has, in order from the object side, a 3a lens unit G3a having a positive refractive power, and a 3b lens unit G3b having a negative refractive power, and is configured to perform a compensation for image field with occurrence of camera shake by moving the 3b lens unit G3b in directions perpendicular to the optical axis. This third lens unit G3 can be made smaller in lens radius than the other lens units and is thus suitable for incorporation of an antivibration mechanism therein.

When the third lens unit G3 is composed of the 3a lens unit G3a with the positive refractive power and the 3b lens unit G3b with the negative refractive power and the 3b lens unit G3b is used as a lens unit for antivibration, it is feasible to achieve downsizing of the antivibration mechanism and reduction in weight of the antivibration lens unit. By adopting this refractive power layout, it is feasible to reduce deterioration of imaging performance with movement of the 3b lens unit G3b for antivibration in the directions perpendicular to the optical axis.

The 3b lens unit G3b is desirably composed of a cemented lens in which a biconcave lens and a positive meniscus lens with a convex surface on the object side are cemented in order from the object side. This allows for good correction for chromatic aberration of axial rays and off-axis rays and good aberration correction for various aberrations arising during the antivibration operation.

A lens surface nearest to the object in the 3b lens unit G3b is desirably formed in an aspherical shape. This allows deterioration of decentering coma to be kept sufficiently small even with decentering of the 3b lens unit G3b (i.e., with movement during the antivibration operation).

The present variable power optical system ZL is desirably configured to move the third lens unit G3 and the fourth lens unit G4 toward the object during the change in the lens position state from the wide-angle end state to the telephoto end state. This allows moving mechanisms for movement of the respective lens units to be constructed in a simple configuration and also allows downsizing of the variable power optical system ZL and reduction in overall length of a lens barrel or the like incorporating the variable power optical system ZL.

The present variable power optical system ZL is desirably configured to move the first lens unit G1 toward the object during the change in the lens position state from the wide-angle end state to the telephoto end state. This allows the moving mechanisms for movement of the respective lens units to be constructed in a simple configuration and also allows reduction in overall length.

The present variable power optical system ZL is desirably configured so that the space between the third lens unit G3 and the fourth lens unit G4 in the wide-angle end state becomes larger than the space between the third lens unit G3 and the fourth lens unit G4 in the telephoto end state. This allows for suppression of field curvature in the transition from the wide-angle end state to the telephoto end state.

The present variable power optical system ZL as described above desirably satisfies Conditions (1), (2), and (3) below, where fw is the focal length of the entire system in the wide-angle end state, ft the focal length of the entire system in the telephoto end state, f3 the focal length of the third lens unit G3, Δd1 an axial moving distance of the first lens unit G1 during the change in the lens position state from the wide-angle end state to the telephoto end state, Δd3 an axial moving distance of the third lens unit G3 during the change in the lens position state from the wide-angle end state to the telephoto end state, and Lw the overall length in the wide-angle end state.

$$0.15 < (Lw \cdot fw)/(\Delta d1 \cdot ft) < 0.58 \quad (1);$$

$$0.42 < (Lw \cdot fw)/(\Delta d3 \cdot ft) < 0.90 \quad (2);$$

$$2.20 < f3/fw \leq 4.50 \quad (3)$$

Condition (1) defines a range of the overall length suitable for ensuring the imaging performance depending upon zoom magnifications. If the ratio is larger than the upper limit of Condition (1), the overall length at the wide-angle end will become large and the diameter of the lens nearest to the object will become large; this will increase the ray heights of off-axis rays, so as to make correction for astigmatism and field curvature difficult and make distortion at the telephoto end larger on the plus side; therefore, it is not preferred. The upper limit of Condition (1) is preferably set to 0.55, 0.50, or 0.48. If the ratio is less than the lower limit of Condition (1) on the other hand, the focal length of the first lens unit G1 will become smaller in order to decrease the axial moving distance Δd1 of the first lens unit G1 and this will make correction for off-axis aberration and correction for astigmatism and field curvature difficult and will make distortion at the wide-angle end larger on the minus side; therefore, it is not preferred. The lower limit of Condition (1) is preferably set to 0.20, 0.25, or 0.30.

Condition (2) defines the moving distance of the third lens unit G3 depending upon zoom magnifications. If the ratio is more than the upper limit of Condition (2), the moving distance of the third lens unit G3 will decrease while the moving distance of the first lens unit G1 will increase, so as to increase the overall length at the telephoto end. Furthermore, the moving distance of the fourth lens unit G4 will increase, so as to make it difficult to ensure the back focus. Furthermore, the decentering coma will increase with occurrence of decentering between the third lens unit G3 and the fourth lens unit G4 due to a manufacturing error and it will make correction for deterioration of imaging performance difficult; therefore, it is not preferred. The upper limit of Condition (2) is preferably set to 0.81, 0.75, or 0.62. If the ratio is less than the lower limit of Condition (2) on the other hand, the focal length of the third lens unit G3 will increase, so as to increase the moving distance. This will increase a correction moving distance of the 3b lens unit G3b during the antivibration operation, so as to increase the size of the antivibration mechanism; therefore, it is not preferred. If the focal lengths of the first lens unit G1 and the second lens unit G2 are decreased in order to mitigate this effect, it will lead to deterioration of spherical aberration in the telephoto end state; therefore, it is not preferred. The lower limit of Condition (2) is preferably set to 0.44 or 0.46.

Condition (3) defines a range of the focal length of the third lens unit G3 suitable for ensuring the back focus and alleviating deterioration of performance due to a manufacturing error. If the ratio is more than the upper limit of Condition (3), the focal length of the third lens unit G3 will increase, so as to increase the overall length and the diameter at the wide-angle end and thus make practical use difficult. In addition, it will lead to increase in size of the stop mechanism and the antivibration mechanism and thus it is not preferred. If the focal length of the second lens unit G2 is decreased in order to mitigate this effect, it will result in deterioration of off-axis aberration at the wide-angle end; therefore, it is not preferred. The upper limit of Condition (3) is preferably set to 3.80, 3.50, or 3.22. If the ratio is less than the lower limit of Condition (3) on the other hand, the back focus will increase and the decentering coma will increase with occurrence of decentering between the third lens unit G3 and the fourth lens unit G4 due to a manufacturing error, so as to make correction for deterioration of imaging performance difficult; therefore, it is not preferred. The lower limit of Condition (3) is preferably set to 2.27, 2.34, or 2.40.

The present variable power optical system ZL desirably satisfies Condition (4) below, where fw is the focal length of the entire system in the wide-angle end state and f1 the focal length of the first lens unit G1.

$$3.50 < f1/fw < 8.00 \tag{4}$$

Condition (4) defines a range of the focal length of the first lens unit G1 suitable for ensuring the back focus and ensuring the imaging performance. If the ratio is more than the upper limit of Condition (4), the focal length of the first lens unit G1 will increase, so as to increase the overall length and diameter of the variable power optical system ZL and increase the heights of off-axis rays and it will be thus difficult to make correction for astigmatism and field curvature. Furthermore, distortion at the telephoto end will become large on the plus side and thus it is not preferred. The upper limit of Condition (4) is preferably set to 7.26, 6.52, or 6.00. If the ratio is less than the lower limit of Condition (4) on the other hand, the back focus will increase and the focal length of the first lens unit G1 will decrease, so as to make correction for off-axis aberration (e.g., astigmatism or field curvature) difficult. In addition, it will cause deterioration of imaging performance at the telephoto end with variation in power to a higher magnification to increase distortion at the telephoto end on the plus side, and it is thus not preferred. The lower limit of Condition (4) is preferably set to 4.00 or 4.50.

Furthermore, the present variable power optical system ZL desirably satisfies Condition (5) below, where f3 is the focal length of the third lens unit G3 and ft the focal length of the entire system in the telephoto end state.

$$0.30 < f3/ft < 1.00 \tag{5}$$

Condition (5) defines the focal length of the third lens unit to the focal length of the present variable power optical system ZL in the telephoto end state. If the ratio is more than the upper limit of Condition (5), the overall length and diameter of the variable power optical system ZL will increase, so as to make practical use thereof difficult. In addition, it will also cause increase in size of the aperture stop mechanism and the antivibration mechanism and thus it is not preferred. If the focal length of the second lens unit G2 is decreased in order to mitigate this effect, it will deteriorate astigmatism and field curvature in the wide-angle end state; therefore, it is not preferred. The upper limit of Condition (5) is preferably set to 0.82, 0.70, or 0.63. If the ratio is less than the lower limit of Condition (5) on the other hand, the decentering coma will become outstanding due to a manufacturing error such as relative decentering between lens units; therefore, it is not preferred. Furthermore, it will also cause deterioration of spherical aberration in the telephoto end state. The lower limit of Condition (5) is preferably set to 0.31, 0.33, or 0.35.

The present variable power optical system ZL desirably satisfies Conditions (6) and (7) below, where fw is the focal length of the entire system in the wide-angle end state, f3 the focal length of the third lens unit G3, f4 the focal length of the fourth lens unit G4, and Bfw the back focus in the wide-angle end state.

$$0.80 < f3/f4 < 1.60 \tag{6};$$

$$1.90 < Bfw/fw < 3.00 \tag{7}$$

Condition (6) defines the ratio of the focal lengths of the third lens unit G3 and the fourth lens unit G4 suitable for ensuring the back focus and alleviating deterioration of performance due to a manufacturing error. When Condition (6) is satisfied, it becomes feasible to make good correction for the off-axis aberrations such as field curvature and coma at the wide-angle end without decrease in the back focus and good correction for various aberrations such as spherical aberration, coma, and chromatic aberration in the telephoto end state and to reduce deterioration of optical performance such as coma with decentering due to a manufacturing error. If the ratio is more than the upper limit of Condition (6), the focal length of the fourth lens unit G4 will become relatively shorter to make it difficult to make correction for coma in the wide-angle end state and coma in the telephoto end state and deterioration of optical performance will become outstanding with decentering due to a manufacturing error; therefore, it is not preferred. The upper limit of Condition (6) is preferably set to 1.40 or 1.21. If the ratio is less than the lower limit of Condition (6) on the other hand, the focal length of the third lens unit G3 will become relatively shorter, so as to decrease the back focus; therefore, it is not preferred. If the focal length of the second lens unit G2 is decreased in order to avoid it, it will result in causing deterioration of off-axis aberration in the wide-angle end state; therefore, it is not preferred. The lower limit of Condition (6) is preferably set to 0.86 or 0.90.

Condition (7) defines a range of the back focus suitable for the digital single-lens reflex camera of a lens interchanging system. If the ratio is more than the upper limit of Condition (7), the back focus will become too long, so as to cause increase in the lens overall length; therefore, it is not preferred. The upper limit of Condition (7) is preferably set to 2.69, 2.50, or 2.37. If the ratio is less than the lower limit of Condition (7) on the other hand, the back focus will become too short, so as to cause interference between the lens rear part and a mirror of the single-lens reflex camera. The lower limit of Condition (7) is preferably set to 1.95 or 2.00.

Figure 26:
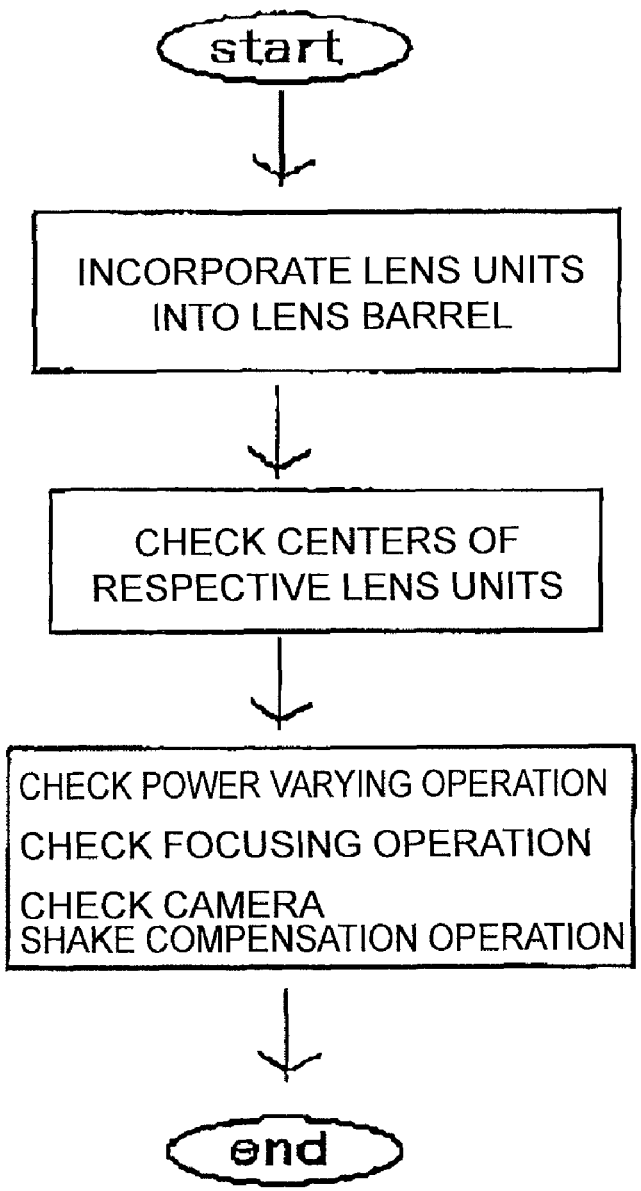
FIG. 26 is a flowchart of a method for manufacturing a variable power optical system according to an embodiment.

A method for manufacturing the variable power optical system will be briefly described below with reference to FIG. 26.

First, the first lens unit G1, the second lens unit G2, the third lens unit G3, and the fourth lens unit G4 of the present embodiment are incorporated into a lens barrel of a cylindrical shape. On the occasion of incorporating each of the lens units into the lens barrel, they may be incorporated one by one in order along the optical axis into the lens barrel, or they may be incorporated into the lens barrel member after some or all of the lens units are integrally held by a holding member. After the lens units are incorporated in the lens barrel, it is preferable to check whether an image of an object is formed in a state in which the lens units are incorporated in the lens barrel.

After the assembly of the variable power optical system as described above, various operations of the variable power optical system are checked. Examples of the various operations include a power-varying operation to move at least a part of the lens units along the optical-axis direction with variation in power, a focusing operation to move a focusing unit for focusing from a far object to a near object along the optical-axis direction, a camera shake compensation operation to move at least a part of the lenses so as to provide a component in a direction perpendicular to the optical axis, and so on. In the present embodiment, the first lens unit G1, the third lens unit G3, and the fourth lens unit G4 are configured to move toward the object during variation in power from the wide-angle end state to the telephoto state. In the present embodiment, the camera shake compensation is implemented by moving a part of the third lens unit G3 (preferably, the 3b lens unit G3b having the negative refractive power) so as to provide a component in a direction perpendicular to the optical axis. A checking order of the various operations is optional.

Figure 21:
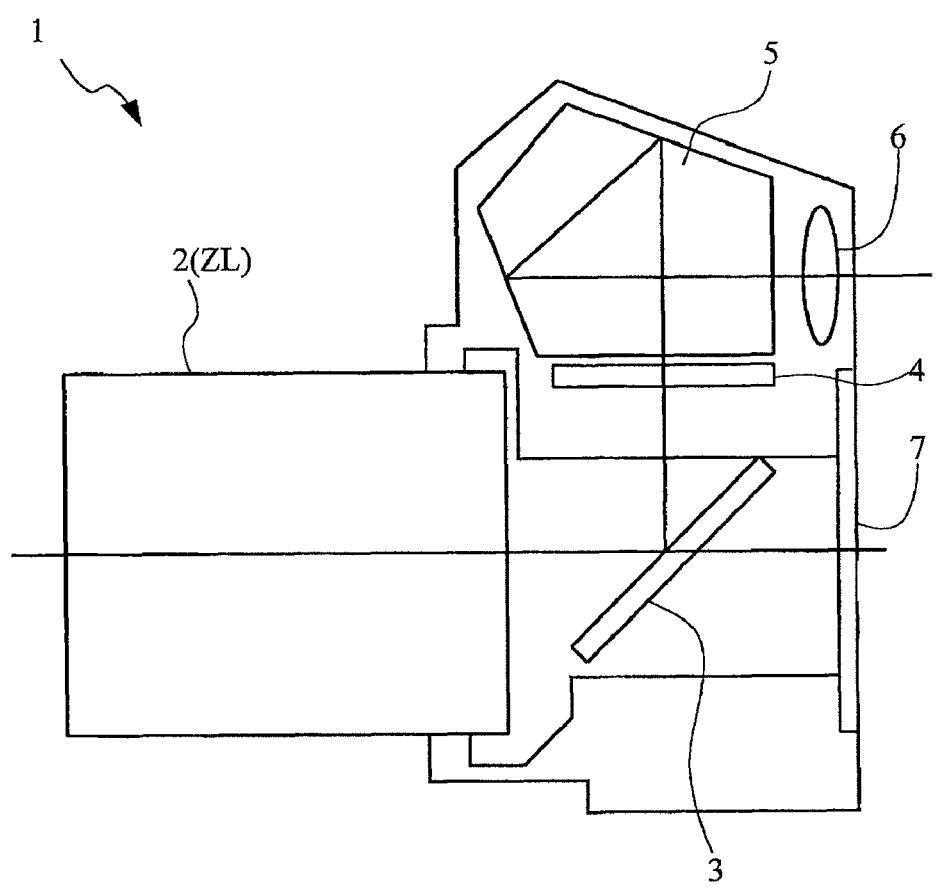
FIG. 21 is a sectional view of a digital single-lens reflex camera equipped with a variable power optical system according to the present invention.

FIG. 21 is a schematic sectional view of a digital single-lens reflex camera 1 (which will be referred to hereinafter simply as a camera) as an optical apparatus equipped with the aforementioned variable power optical system ZL. In this camera 1, light from an unrepresented object (subject) is condensed by a taking lens 2 (variable power optical system ZL) and travels via a quick return mirror 3 to be focused on a focusing screen 4. Then the light focused on the focusing screen 4 is reflected plural times in a pentagonal prism 5 to be guided to an eyepiece lens 6. This allows a photographer to observe an image of the object (subject) as an erected image through the eyepiece lens 6.

When the photographer depresses an unrepresented release button, the quick return mirror 3 is retracted out of the optical path and the light from the unrepresented object (subject) condensed by the taking lens 2 forms a subject image on an imaging device 7. This causes the light from the object (subject) to be picked up by the imaging device 7 and to be recorded as an object (subject) image in a memory not shown. In this manner, the photographer can photograph the object (subject) with the present camera 1. The camera 1 illustrated in FIG. 21 may be one on which the variable power optical system ZL is held in a detachable state or one integrally molded with the variable power optical system ZL. The camera 1 may also be a so-called single-lens reflex camera, or a compact camera without the quick return mirror and others.

The above description and embodiments described hereinafter show the variable power optical system ZL of the four-unit configuration, but the above constitutive conditions and others are also applicable to other unit configurations such as five-unit and six-unit configurations. It is also possible to move the 3a lens unit G3a and the 3b lens unit G3b of the third lens unit G3 separately during zooming.

A single lens unit or a plurality of lens units, or a partial lens unit may be configured as a focusing lens unit to be moved along the optical-axis direction so as to implement focusing from an infinite object to a near object. In this case, the focusing lens unit can also be applied to autofocus and is also suitable for motor drive (such as an ultrasonic motor or the like) for autofocus. Particularly, the second lens unit G2 is preferably configured as a focusing lens unit.

A lens surface may be constructed as an aspherical surface. In this case, the aspherical surface may be any one of an aspherical surface made by grinding, a glass mold aspherical surface made by molding glass in an aspherical shape with a mold, and a composite aspherical surface made by forming a resin in an aspherical shape on a surface of glass. A lens surface may be a diffracting surface and a lens may be a gradient index lens (GRIN lens) or a plastic lens.

An aperture stop S is preferably arranged nearest to the object in the vicinity of the third lens unit G3, or arranged between the second lens unit G2 and the third lens unit G3, but it is also possible to adopt a configuration without any member as an aperture stop and with a lens frame functioning as the aperture stop.

Furthermore, each lens surface may be coated with an antireflection film having high transmittance across a wide wavelength range, so as to reduce flare and ghost, thereby achieving high-contrast optical performance.

The variable power optical system ZL of the present embodiment has the focal lengths of about 25-29 mm in the wide-angle end state and about 150-170 mm in the telephoto end state in terms of 35 mm-film size, and a power variation ratio of about 5 to 6.

In the variable power optical system ZL of the present embodiment, the first lens unit G1 preferably has two positive lens components and one negative lens component. The first lens unit G1 is preferably configured by arranging the lens components in an order of negative, positive, and positive in order from the object side. It is also preferable to cement the first and second lens components together.

In the variable power optical system ZL of the present embodiment, the second lens unit G2 preferably has one positive lens component and three negative lens components. The second lens unit G2 is preferably configured by arranging the lens components in an order of negative, negative, positive, and negative in order from the object side.

In the variable power optical system ZL of the present embodiment, the 3a lens unit G3a preferably has two positive lens components and a negative lens component. The 3a lens unit G3a is preferably configured by arranging the lens components in an order of positive, positive, and negative in order from the object side. The order of the lens components may be negative, positive, and positive, or, positive, negative, and positive.

In the variable power optical system ZL of the present embodiment, the 3b lens unit G3b preferably has one positive lens component and one negative lens component. The arrangement of the lens components in the 3b lens unit G3b may be any order of negative and positive, or, positive and negative in order from the object side, but they are preferably cemented together to be held by a single lens holder.

In the variable power optical system ZL of the present embodiment, the fourth lens unit G4 is preferably configured so as to allow change in lens configuration in accordance with aberration correction during the antivibration operation.

The present invention was described above with the constituent features of the embodiments for describing the invention in an easily understood manner, but it is needless to mention that the present invention is by no means limited to them.

EXAMPLE 1

Each of examples of the present invention will be described below on the basis of the accompanying drawings. FIG. 1 is a sectional view showing a configuration of a variable power optical system ZL according to the present example and shows a refractive power layout of this variable power optical system ZL and states of movement of the respective lens units with change in the focal distance state from the wide-angle end state (W) to the telephoto end state (T) by arrows in the lower part of FIG. 1. As shown in this FIG. 1, the variable power optical system ZL according to the present example is composed of, in order from the object side along the optical axis, a first lens unit G1 having a positive refractive power, a second lens unit G2 having a negative refractive power, a third lens unit G3 having a positive refractive power, and a fourth lens unit G4 having a positive refractive power. During change in the lens position state from the wide-angle end state to the telephoto end state, the first lens unit G1, the third lens unit G3, and the fourth lens unit G4 move toward the object and the second lens unit moves toward the image plane so as to increase an aerial space between the first lens unit G1 and the second lens unit G2, decrease an aerial space between the second lens unit G2 and the third lens unit G3, and decrease an aerial space between the third lens unit G3 and the fourth lens unit G4. The third lens unit G3 is composed of, in order from the object side, a 3a lens unit G3a having a positive refractive power and a 3b lens unit G3b having a negative refractive power, and a camera shake compensation (antivibration) is implemented by moving the 3b lens unit G3b in directions perpendicular to the optical axis.

An aperture stop S is located between the second lens unit G2 and the third lens unit G3 and moves together with the 3a lens unit G3a during variation in power from the wide-angle end state to the telephoto end state. A flare cut stop FS is located between the third lens unit G3 and the fourth lens unit G4 and is configured not to move during the antivibration operation but to move together with the third lens unit G3 during zooming. Focusing from a far distance to a short distance is implemented by moving the second lens unit G2 toward the object.

In each example, an aspherical surface is represented by Eq (a) below, where y is a height in a direction normal to the optical axis, S(y) a distance (sag) along the optical axis from a tangent plane to a top of the aspherical surface at the height y to the aspherical surface, r a radius of curvature of a reference spherical surface (paraxial curvature radius), κ the conic constant, and An the nth-order aspherical coefficient. In the examples hereinafter, "E–n" represents "×10$^{-n}$."

$$S(y)=(y^2/r)/\{1+(1-\kappa \times y^2/r^2)^{1/2}\}+A4 \times y^4+A6 \times y^6+A8 \times y^8+A10 \times y^{10} \qquad (a)$$

In each example, the second-order aspherical coefficient A2 is 0. In tables of the respective examples, each aspherical surface is accompanied by mark * on the left to a surface number.

FIRST EXAMPLE

FIG. 1 is a drawing showing a configuration of a variable power optical system ZL1 according to the first example. In this variable power optical system ZL1 in FIG. 1, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative meniscus lens L21 with a convex surface on the object side, a negative lens L22 of a biconcave shape, a positive lens L23 of a biconvex shape, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3a of the third lens unit G3 is composed of, in order from the object side, a positive lens L31 of a biconvex shape, and a cemented lens of a positive lens L32 of a biconvex shape and a negative meniscus lens L33 with a concave surface on the object side. The 3b lens unit G3b of the third lens unit G3 is composed of, in order from the object side, a cemented lens of a negative lens L34 of a biconcave shape and a positive meniscus lens L35 with a convex surface on the object side, and the negative lens L34 of the biconcave shape located nearest to the object in the 3b lens unit G3b is an aspherical lens having an aspherical surface made by providing a resin layer on a glass lens surface on the object side. The fourth lens unit G4 is composed of, in order from the object side, a positive lens L41 of a biconvex shape, a cemented lens of a positive lens L42 of a biconvex shape and a negative lens L43 of a biconcave shape, and a positive lens L44 of a biconvex shape, and the positive lens L41 of the biconvex shape located nearest to the object in the fourth lens unit G4 is an aspherical lens having an object-side lens surface made in an aspherical shape.

In the case of a lens where the focal length of the entire system is f and where an antivibration compensation factor (ratio of an image moving amount on the image plane to a moving amount of a moving lens unit in a shake compensation) is K, a rotational deviation of angle θ can be corrected by moving the moving lens unit for shake compensation by (f·tan θ)/K in a direction perpendicular to the optical axis (this explanation will also apply similarly to the examples below). Since the antivibration compensation factor is 0.999 and the focal length is 18.50 (mm) at the wide-angle end in this first example, the moving amount of the 3b lens unit G3b for compensation for the rotational deviation of 0.60° is 0.194 (mm). Since the antivibration compensation factor is 1.789 and the focal length is 131.00 (mm) at the telephoto end in this first example, the moving amount of the 3b lens unit G3b for compensation for the rotational deviation of 0.27° is 0.345 (mm).

Table 1 below provides values of specifications of the first example. In this table 1, f represents the focal length, FNO the F number, 2ω the field angle (in unit of "°"), and Bf the back focus. Furthermore, the surface number represents an order of each lens surface from the object side along the direction of travel of rays, the surface separation an axial distance from each optical surface to a next optical surface, and the Abbe number and refractive index values for the d line ($\lambda$=587.6 nm). The units of the focal length f, radius of curvature, surface separation, and other lengths described in all the specification values below are generally "mm," but the units do not have to be limited to this unit because equivalent optical performance can also be achieved by optical systems proportionally enlarged or proportionally reduced. The radius of curvature of ∞ indicates a plane and the refractive index of air of 1.00000 is omitted. The description of these reference symbols and the description of specification tables also apply to the examples below.

TABLE 1

|  | WIDE ANGLE END |  | INTERMEDIATE FOCAL LENGTH |  | TELEOHOTO END |
| --- | --- | --- | --- | --- | --- |
| f = | 18.50 | ~ | 70.00 | ~ | 131.00 |
| FNO = | 3.39 | ~ | 4.66 | ~ | 5.55 |
| 2ω = | 77.88 | ~ | 22.29 | ~ | 12.14 |
| IMAGE HEIGHT = | 14.20 | ~ | 14.20 | ~ | 14.20 |
| OVERALL LENGTH = | 131.568 | ~ | 170.966 | ~ | 191.247 |

| SURFACE NO. NO. | RADIUS OF CURVATURE | SURFACE SEPARATION | ABBE NUMBER | REFRACTIVE INDEX |
| --- | --- | --- | --- | --- |
| 1 | 132.7091 | 2.0000 | 23.78 | 1.846660 |
| 2 | 69.0393 | 7.6047 | 70.23 | 1.487490 |
| 3 | −613.4510 | 0.1000 |  |  |
| 4 | 58.5782 | 6.0340 | 50.88 | 1.658441 |
| 5 | 211.3695 | (d5) |  |  |
| *6 | 277.8767 | 0.1500 | 38.09 | 1.553890 |
| 7 | 133.7106 | 1.2000 | 46.63 | 1.816000 |
| 8 | 14.4529 | 6.6840 |  |  |
| 9 | −36.6145 | 1.0000 | 46.63 | 1.816000 |
| 10 | 55.0282 | 0.1000 |  |  |
| 11 | 35.0000 | 3.9063 | 23.78 | 1.846660 |
| 12 | −37.5947 | 1.0681 |  |  |
| 13 | −22.3441 | 1.0000 | 47.38 | 1.788000 |
| 14 | −56.4883 | (d14) |  |  |
| 15 | ∞ | 0.5000 | (APERTURE STOP S) |  |
| 16 | 38.9611 | 2.7439 | 64.19 | 1.516798 |
| 17 | −45.5432 | 0.1000 |  |  |
| 18 | 24.9617 | 3.4225 | 81.61 | 1.497000 |
| 19 | −36.3323 | 1.0000 | 32.35 | 1.850260 |
| 20 | −313.2423 | 3.0000 |  |  |
| *21 | −34.6816 | 0.1000 | 38.09 | 1.553890 |
| 22 | −35.1754 | 1.0000 | 64.10 | 1.516800 |
| 23 | 36.6948 | 1.5591 | 27.51 | 1.755199 |
| 24 | 52.5702 | 1.5000 |  |  |
| 25 | ∞ | (d25) | (FLARE CUT STOP) |  |
| *26 | 55.8550 | 3.9010 | 64.03 | 1.516120 |
| 27 | −27.9232 | 0.5000 |  |  |
| 28 | 500.0000 | 3.3875 | 60.67 | 1.563839 |
| 29 | −26.2504 | 1.3000 | 37.16 | 1.834000 |
| 30 | 46.2587 | 0.8872 |  |  |
| 31 | 110.0000 | 3.2902 | 50.89 | 1.658441 |
| 32 | −38.6328 | (Bf) |  |  |

Focal lengths and moving distances of lens units f1 = 98.396
f2 = −14.860
f3 = 47.189

TABLE 1-continued f4 = 43.127
Δd1 = 59.697
Δd3 = 36.679

In this first example, each lens surface of the sixth surface, the twenty first surface, and the twenty sixth surface is formed in an aspherical shape. Table 2 below provides data of the aspherical surfaces, i.e., values of the conic constant κ and the aspherical constants A4-A10 thereof.

TABLE 2

|  | κ | A4 | A6 | A8 | A10 |
|---|---|---|---|---|---|
| 6th surface | 1.0000 | 1.67350E−05 | −3.76300E−08 | 8.64890E−11 | −4.98470E−14 |
| 21st surface | 5.9254 | 2.86560E−05 | 5.91680E−09 | 4.57110E−10 | 0.00000E+00 |
| 26th surface | −26.7202 | −1.22480E−05 | −2.80120E−08 | −1.97490E−11 | 0.00000E+00 |

In this first example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 3 below provides the varying spaces at respective focal lengths in the wide-angle end state, in an intermediate focal length state, and in the telephoto end state.

TABLE 3

|  | WIDE ANGLE END | INTERMEDIATE FOCAL LENGTH | TELEOHOTO END |
|---|---|---|---|
| f | 18.500 | 70.000 | 131.000 |
| d5 | 2.070 | 38.567 | 49.422 |
| d14 | 26.242 | 8.138 | 1.800 |
| d25 | 6.250 | 2.232 | 1.450 |
| Bf | 37.967 | 62.990 | 79.536 |

Table 4 below shows values corresponding to the respective conditions in the first example. In this Table 4, Lw represents the overall length in the wide-angle end state, fw the focal length of the entire system in the wide-angle end state, ft the focal length of the entire system in the telephoto end state, Δd1 the axial moving distance of the first lens unit G1 during the change in the lens position state from the wide-angle end state to the telephoto end state, Δd3 the axial moving distance of the third lens unit G3 during the change in the lens position state from the wide-angle end state to the telephoto end state, f1 the focal length of the first lens unit G1, f3 the focal length of the third lens unit G3, f4 the focal length of the fourth lens unit G4, and Bfw the back focus in the wide-angle end state. This description of reference symbols also applies to the examples below.

TABLE 4

(1)(Lw · fw)/(Δd1 · ft) = 0.311
(2)(Lw · fw)/(Δd3 · ft) = 0.505
(3)f3/fw = 2.551
(4)f1/fw = 5.319
(5)f3/ft = 0.360
(6)f3/f4 = 1.094
(7)Bfw/fw = 2.052

Figure 2:
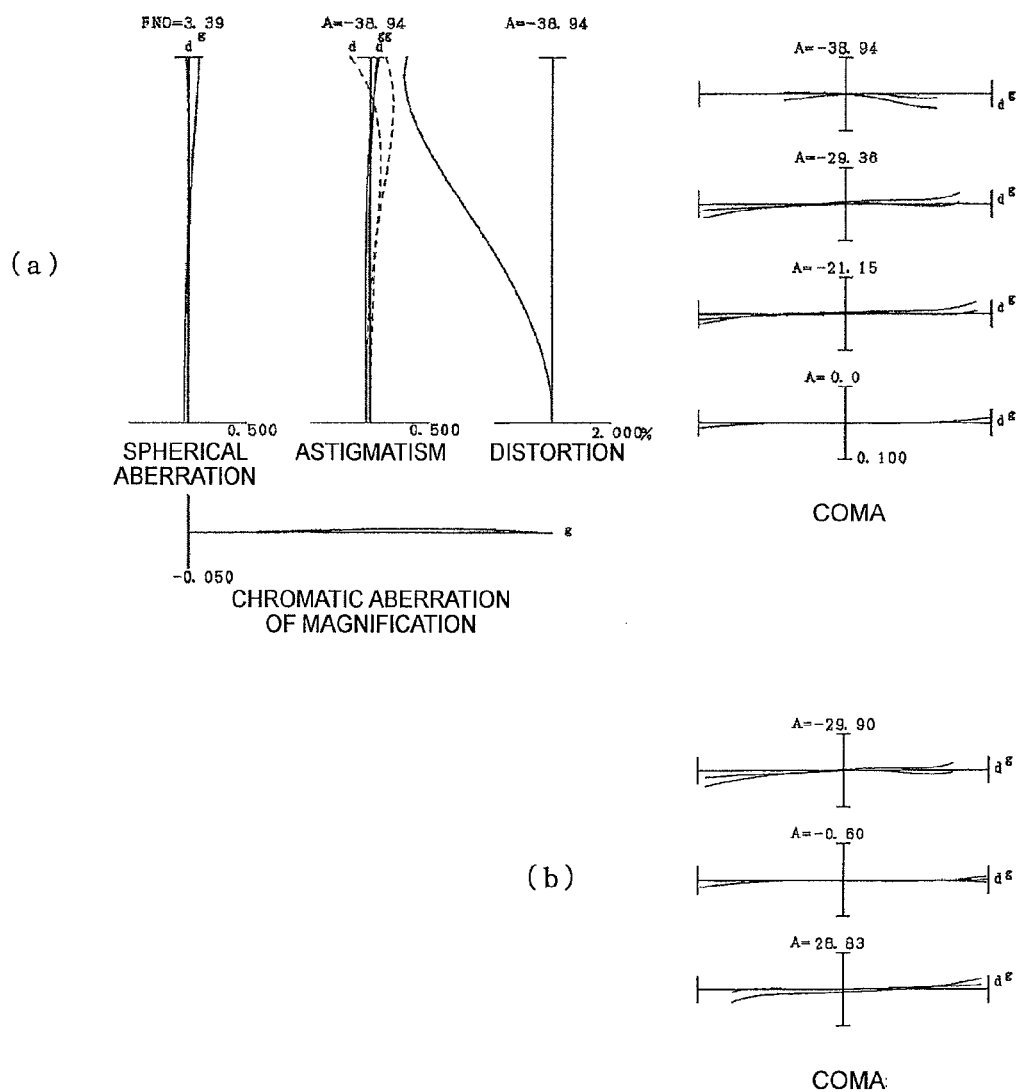
FIG. 2 is various aberration diagrams in an infinity in-focus state in the first example, wherein (a) is various aberration diagrams in the wide-angle end state and (b) coma aberration diagrams with execution of a shake compensation for a rotational deviation of 0.60° in an infinity photography state in the wide-angle end state.
Figure 3:
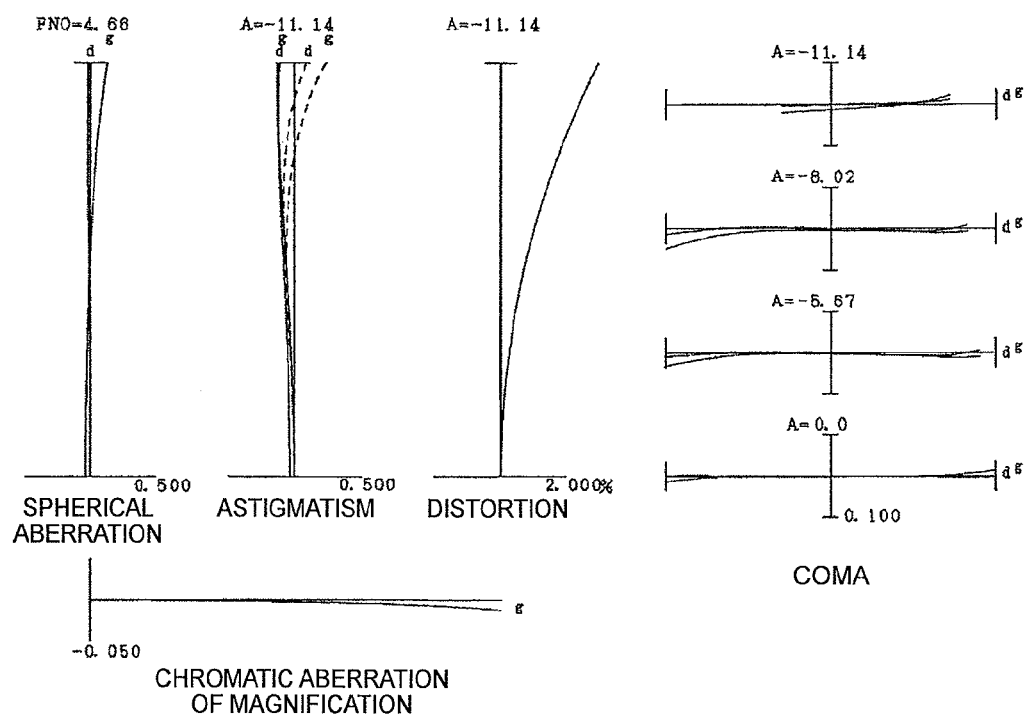
FIG. 3 is aberration diagrams in the infinity in-focus state in an intermediate focal length state in the first example.
Figure 4:
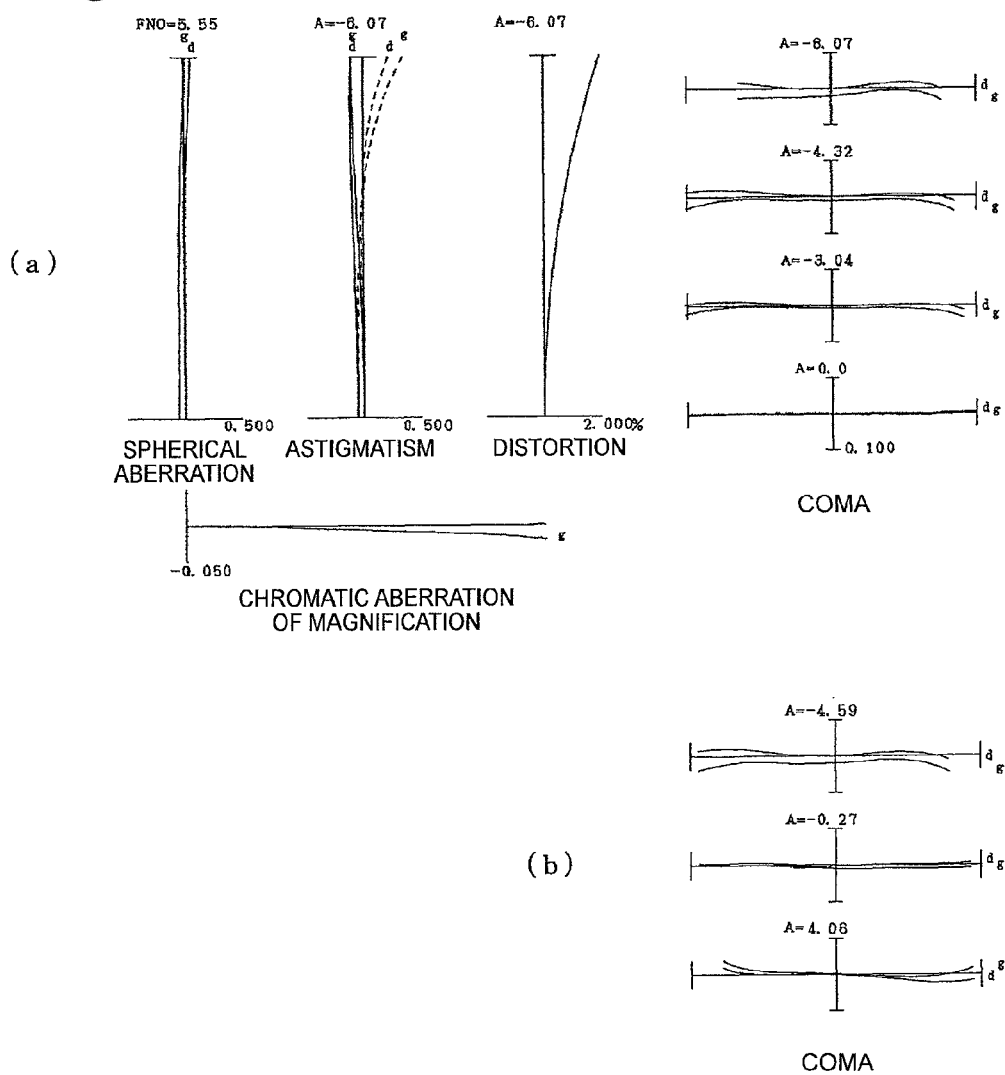
FIG. 4 is various aberration diagrams in the infinity in-focus state in the first example, wherein (a) is various aberration diagrams in the telephoto end state and (b) coma aberration diagrams with execution of a shake compensation for a rotational deviation of 0.27° in the infinity photography state in the telephoto end state.

FIG. 2 (a) shows aberration diagrams in the infinity in-focus state in the wide-angle end state in the first example, FIG. 3 aberration diagrams in the infinity in-focus state in the intermediate focal length state, and FIG. 4 (a) aberration diagrams in the infinity in-focus state in the telephoto end state. FIG. 2 (b) shows coma aberration diagrams with execution of the shake compensation for the rotational deviation of 0.60° in the infinity photography state in the wide-angle end state in the first example and FIG. 4 (b) coma aberration diagrams with execution of the shake compensation for the rotational deviation of 0.27° in the infinity photography state in the telephoto end state in the first example.

In each aberration diagram, FNO indicates the F number, A a half field angle (in unit of "°"), d the d-line (λ=587.6 nm), and g the g line (λ=435.6 nm). In the spherical aberration diagrams the F number is a value corresponding to a maximum aperture; in each of the astigmatism aberration diagrams and distortion aberration diagrams a maximum field angle is shown; in the coma aberration diagrams there are values at respective field angles shown. In the astigmatism aberration diagrams a solid line represents a sagittal image surface and a dashed line a meridional image surface. Furthermore, in the spherical aberration diagrams, a solid line represents spherical aberration. The description of the aberration diagrams will also apply to the examples below. As apparent from the aberration diagrams, it is seen that the optical system in the first example is well corrected for the various aberrations in each of the focal length states ranging from the wide-angle end state to the telephoto end state and has excellent imaging performance.

SECOND EXAMPLE

Figure 5:
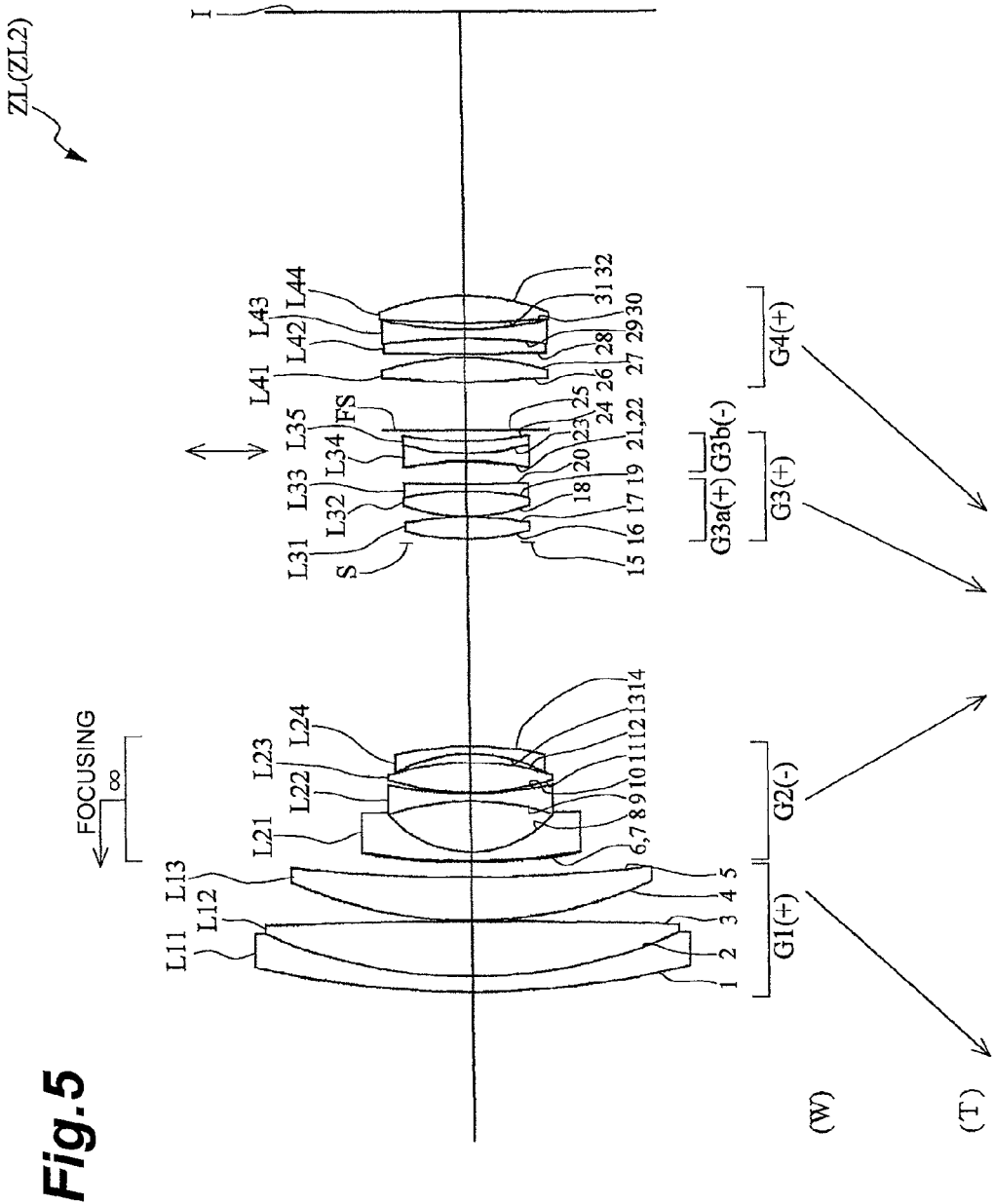
FIG. 5 is a sectional view showing a configuration of a variable power optical system according to the second example.

FIG. 5 is a drawing showing a configuration of a variable power optical system ZL2 according to the second example. In this variable power optical system ZL2 in FIG. 5, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative meniscus lens L21 with a convex surface on the object side, a negative lens L22 of a biconcave shape, a positive lens L23 of a biconvex shape, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3a of the third lens unit G3 is composed of, in order from the object side, a positive lens L31 of a biconvex shape, and a cemented lens of a positive lens L32 of a biconvex shape and a negative lens L33 of a biconcave shape. The 3b lens unit G3b of the third lens unit G3 is composed of, in order from the object side, a cemented lens of a negative lens L34 of a biconcave shape and a positive meniscus lens L35 with a convex surface on the object side, and the negative lens L34 of the biconcave shape located nearest to the object in the 3b lens unit G3b is an aspherical lens having an aspherical surface made by providing a resin layer on a glass lens surface on the object side. The fourth lens unit G4 is composed of, in order from the object side, a positive lens L41 of a biconvex shape, a cemented lens of a positive lens L42 of a biconvex shape and a negative lens L43 of a biconcave shape, and a positive lens L44 of a biconvex shape, and the positive lens L41 of the biconvex shape located nearest to the object in the fourth lens unit G4 is an aspherical lens having an object-side lens surface made in an aspherical shape.

Since the antivibration compensation factor is 0.928 and the focal length is 18.50 (mm) at the wide-angle end in this second example, the moving amount of the 3b lens unit G3b for compensation for the rotational deviation of 0.60° is 0.209 (mm). Since the antivibration compensation factor is 1.687 and the focal length is 131.00 (mm) at the telephoto end in this second example, the moving amount of the 3b lens unit G3b for compensation for the rotational deviation of 0.27° is 0.369 (mm).

Table 5 below provides values of specifications of the second example.

TABLE 5

|  | WIDE ANGLE END |  | INTERMEDIATE FOCAL LENGTH |  | TELEOHOTO END |
|---|---|---|---|---|---|
| f = | 18.50 | ~ | 70.00 | ~ | 131.00 |
| FNO = | 3.47 | ~ | 5.11 | ~ | 5.73 |

TABLE 5-continued

| 2ω = | 76.67 | ~ | 22.38 | ~ | 12.14 |
|---|---|---|---|---|---|
| IMAGE HEIGHT = | 14.20 | ~ | 14.20 | ~ | 14.20 |
| OVERALL LENGTH = | 131.591 | ~ | 170.738 | ~ | 191.244 |

| SURFACE NO. | RADIUS OF CURVATURE | SURFACE SEPARATION | ABBE NUMBER | REFRACTIVE INDEX |
|---|---|---|---|---|
| 1 | 127.1007 | 2.0000 | 23.78 | 1.846660 |
| 2 | 68.0866 | 7.4621 | 70.23 | 1.487490 |
| 3 | −789.7221 | 0.1000 |  |  |
| 4 | 58.5100 | 5.7779 | 50.88 | 1.658441 |
| 5 | 205.2524 | (d5) |  |  |
| *6 | 155.8421 | 0.1500 | 38.09 | 1.553890 |
| 7 | 91.9644 | 1.2000 | 42.72 | 1.834807 |
| 8 | 14.4078 | 6.8486 |  |  |
| 9 | −33.7631 | 1.0000 | 46.63 | 1.816000 |
| 10 | 52.3310 | 0.1000 |  |  |
| 11 | 35.0000 | 4.0788 | 23.78 | 1.846660 |
| 12 | −35.3134 | 1.1463 |  |  |

TABLE 5-continued

| 13 | −20.8608 | 1.0000 | 47.38 | 1.788000 |
|---|---|---|---|---|
| 14 | −46.1994 | (d14) |  |  |
| 15 | ∞ | 0.5000 | (APERTURE STOP S) | |
| 16 | 33.3603 | 2.9346 | 64.19 | 1.516798 |
| 17 | −42.6922 | 0.1000 |  |  |
| 18 | 24.9127 | 3.3760 | 81.61 | 1.497000 |
| 19 | −38.2884 | 1.0000 | 32.35 | 1.850260 |
| 20 | 573.0840 | 3.0000 |  |  |
| *21 | −37.4522 | 0.1000 | 38.09 | 1.553890 |
| 22 | −37.6846 | 1.0000 | 64.10 | 1.516800 |
| 23 | 31.2120 | 1.6802 | 27.51 | 1.755199 |
| 24 | 50.0206 | 1.5000 |  |  |
| 25 | ∞ | (d25) | (FLARE CUT STOP) | |
| *26 | 64.5178 | 3.2899 | 64.03 | 1.516120 |
| 27 | −35.6588 | 0.5000 |  |  |
| 28 | 500.0000 | 2.0396 | 70.41 | 1.487490 |
| 29 | −78.8097 | 1.3000 | 32.35 | 1.850260 |
| 30 | 50.8610 | 0.8683 |  |  |
| 31 | 140.0573 | 3.6434 | 70.41 | 1.487490 |
| 32 | −29.2586 | (Bf) |  |  |

Focal lengths and moving distances of lens units f1 = 98.935
f2 = −15.109
f3 = 44.583
f4 = 46.104
Δd1 = 59.653
Δd3 = 38.373

In this second example, each lens surface of the sixth surface, the twenty first surface, and the twenty sixth surface is formed in an aspherical shape. Table 6 below provides data of the aspherical surfaces, i.e., values of the conic constant κ and the aspherical constants A4-A10 thereof.

TABLE 6

|  | κ | A4 | A6 | A8 | A10 |
|---|---|---|---|---|---|
| 6th surface | 1.0000 | 1.80020E−05 | −3.75590E−08 | 6.82670E−11 | 8.79960E−14 |
| 21st surface | 9.7304 | 3.14860E−05 | 5.10490E−08 | 8.64750E−10 | 0.00000E+00 |
| 26th surface | −0.2727 | −3.48330E−05 | 2.53290E−08 | −1.86100E−10 | 0.00000E+00 |

In this second example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 7 below provides the varying spaces at respective focal lengths in the wide-angle end state, in an intermediate focal length state, and in the telephoto end state.

TABLE 7

|  | WIDE ANGLE END | INTERMEDIATE FOCAL LENGTH | TELEOHOTO END |
|---|---|---|---|
| f | 18.500 | 70.000 | 131.000 |
| d5 | 2.070 | 33.852 | 48.965 |
| d14 | 27.416 | 7.230 | 1.800 |
| d25 | 6.418 | 2.049 | 1.450 |
| Bf | 37.991 | 69.912 | 81.333 |

Table 8 below shows values corresponding to the respective conditions in the second example.

TABLE 8

(1)(Lw · fw)/(Δd1 · ft) = 0.312
(2)(Lw · fw)/(Δd3 · ft) = 0.484
(3)f3/fw = 2.410
(4)f1/fw = 5.348
(5)f3/ft = 0.340
(6)f3/f4 = 0.967
(7)Bfw/fw = 2.054

Figure 6:
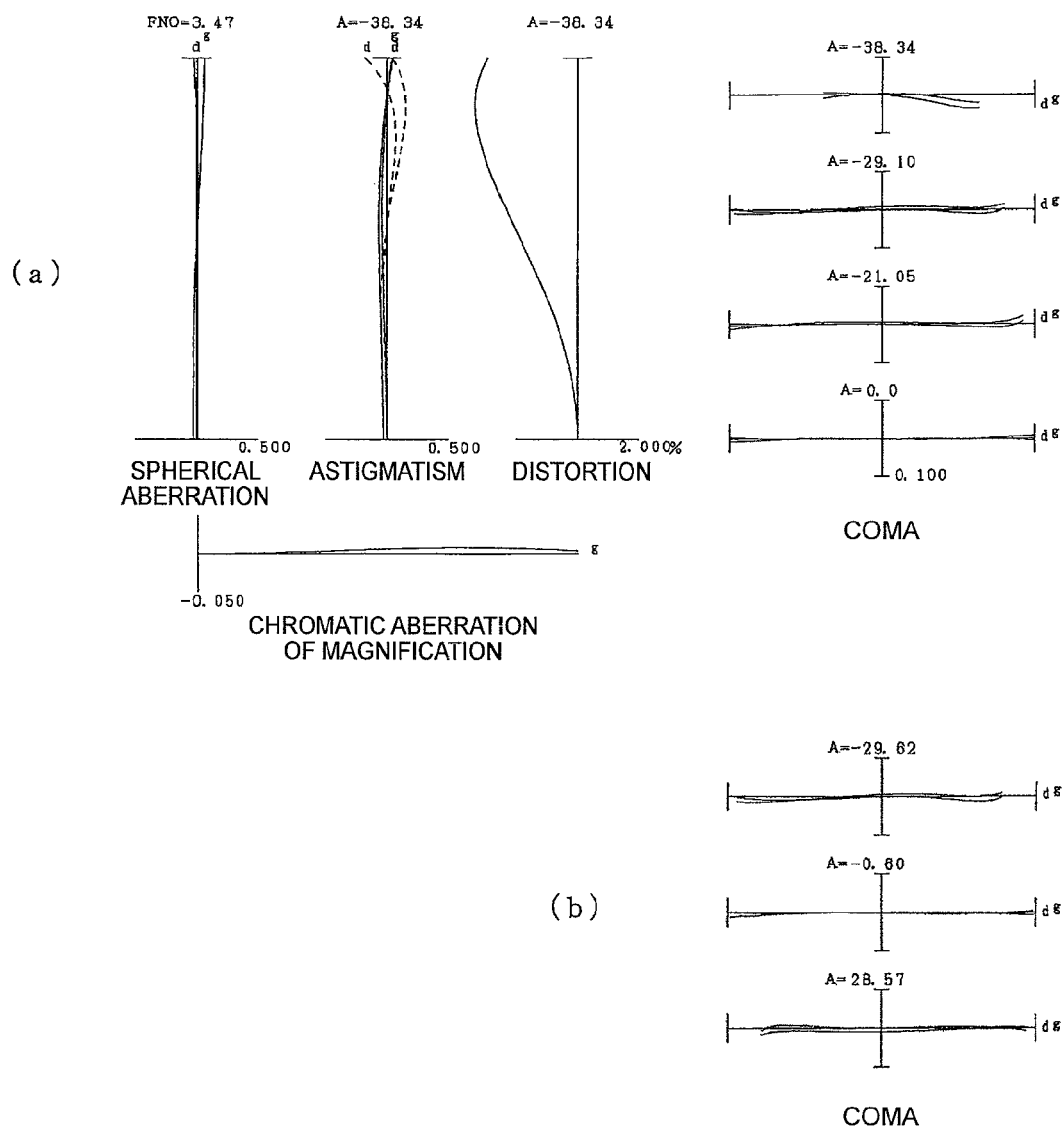
FIG. 6 is various aberration diagrams in the infinity in-focus state in the second example, wherein (a) is various aberration diagrams in the wide-angle end state and (b) coma aberration diagrams with execution of a shake compensation for a rotational deviation of 0.60° in the infinity photography state in the wide-angle end state.
Figure 7:
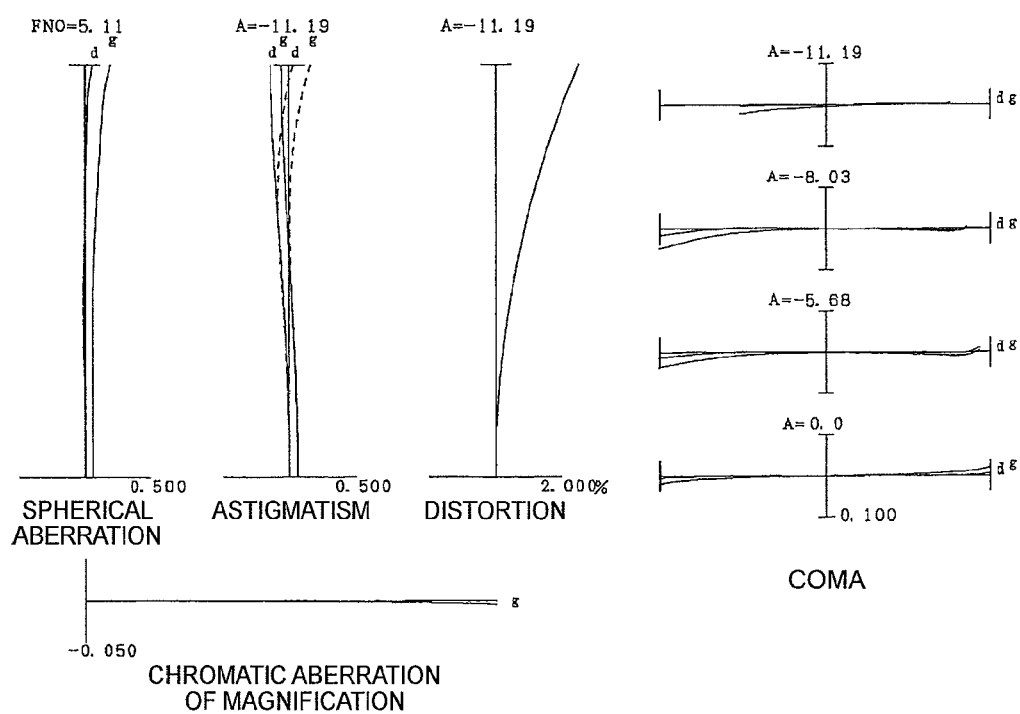
FIG. 7 is aberration diagrams in the infinity in-focus state in an intermediate focal length state in the second example.
Figure 8:
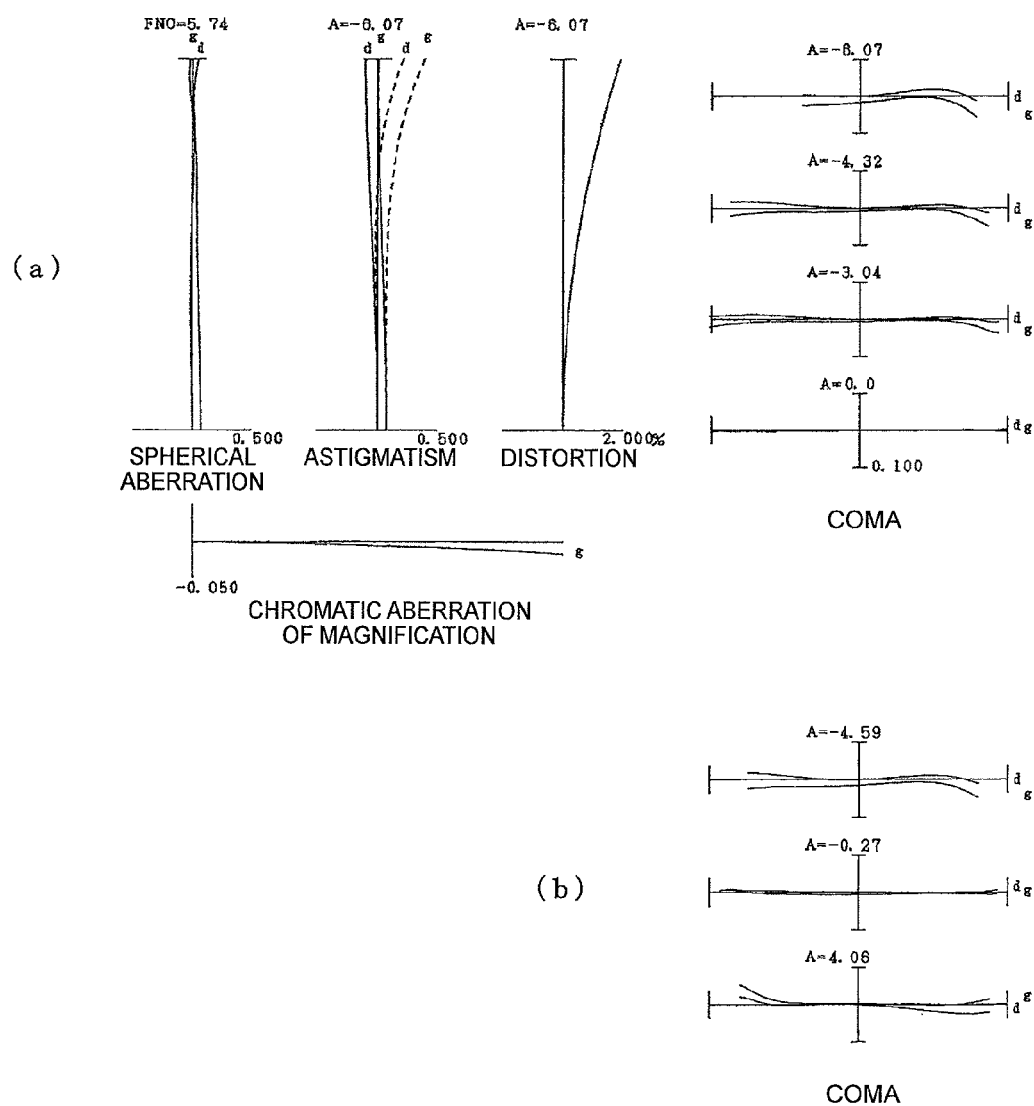
FIG. 8 is various aberration diagrams in the infinity in-focus state in the second example, wherein (a) is various aberration diagrams in the telephoto end state and (b) coma aberration diagrams with execution of a shake compensation for a rotational deviation of 0.27° in the infinity photography state in the telephoto end state.

FIG. 6 (a) shows aberration diagrams in the infinity in-focus state in the wide-angle end state in the second example, FIG. 7 aberration diagrams in the infinity in-focus state in the intermediate focal length state, and FIG. 8 (a) aberration diagrams in the infinity in-focus state in the telephoto end state. FIG. 6 (b) shows coma aberration diagrams with execution of the shake compensation for the rotational deviation of 0.60° in the infinity photography state in the wide-angle end state in the second example and FIG. 8 (b) coma aberration diagrams with execution of the shake compensation for the rotational deviation of 0.27° in the infinity photography state in the telephoto end state in the second example. As apparent from the aberration diagrams, it is seen that the optical system in the second example is well corrected for the various aberrations in each of the focal length states ranging from the wide-angle end state to the telephoto end state and has excellent imaging performance.

THIRD EXAMPLE

Figure 9:
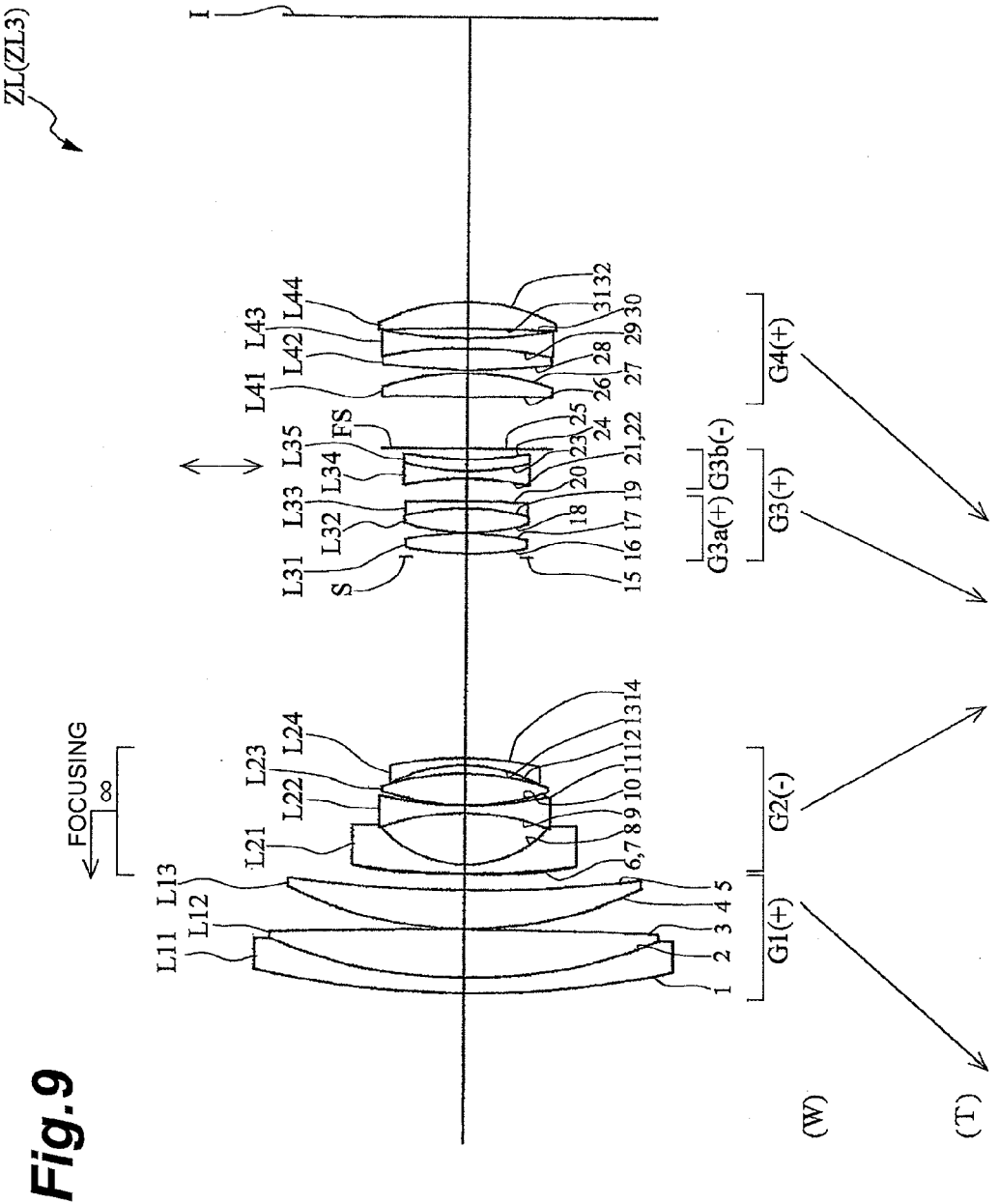
FIG. 9 is a sectional view showing a configuration of a variable power optical system according to the third example.

FIG. 9 is a drawing showing a configuration of a variable power optical system ZL3 according to the third example. In this variable power optical system ZL3 in FIG. 9, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative meniscus lens L21 with a convex surface on the object side, a negative lens L22 of a biconcave shape, a positive lens L23 of a biconvex shape, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3a of the third lens unit G3 is composed of, in order from the object side, a positive lens L31 of a biconvex shape, and a cemented lens of a positive lens L32 of a biconvex shape and a negative meniscus lens L33 with a concave surface on the object side. The 3b lens unit G3b of the third lens unit G3 is composed of, in order from the object side, a cemented lens of a negative lens L34 of a biconcave shape and a positive meniscus lens L35 with a convex surface on the object side, and the negative lens L34 of the biconcave shape located nearest to the object in the 3b lens unit G3b is an aspherical lens having an aspherical surface made by providing a resin layer on a glass lens surface on the object side. The fourth lens unit G4 is composed of, in order from the object side, a positive lens L41 of a biconvex shape, a cemented lens of a positive lens L42 of a biconvex shape and a negative lens L43 of a biconcave shape, and a positive meniscus lens L44 with a convex surface on the image plane side, and the positive lens L41 of the biconvex shape located nearest to the object in the fourth lens unit G4 is an aspherical lens having an object-side lens surface made in an aspherical shape.

Since the antivibration compensation factor is 1.000 and the focal length is 18.50 (mm) in the wide-angle end state in this third example, the moving amount of the 3b lens unit G3b for compensation for the rotational deviation of 0.60° is 0.194 (mm). Since the antivibration compensation factor is 1.797 and the focal length is 105.00 (mm) in the telephoto end state in this third example, the moving amount of the 3b lens unit G3b for compensation for the rotational deviation of 0.30° is 0.306 (mm).

Table 9 below provides values of specifications of the third example.

TABLE 9

| | WIDE ANGLE END | | INTERMEDIATE FOCAL LENGTH | | TELEOHOTO END |
|---|---|---|---|---|---|
| f = | 18.50 | ~ | 65.00 | ~ | 105.00 |
| FNO = | 3.52 | ~ | 5.13 | ~ | 5.74 |
| 2ω = | 78.26 | ~ | 24.33 | ~ | 15.24 |
| IMAGE HEIGHT = | 14.20 | ~ | 14.20 | ~ | 14.20 |
| OVERALL L LENGTH = | 131.517 | ~ | 163.372 | ~ | 180.515 |

| SURFACE NO. | RADIUS OF CURVATURE | SURFACE SEPARATION | ABBE NUMBER | REFRACTIVE INDEX |
|---|---|---|---|---|
| 1 | 134.7329 | 2.0000 | 23.78 | 1.846660 |
| 2 | 68.5573 | 6.5591 | 70.23 | 1.487490 |
| 3 | −633.6719 | 0.1000 | | |
| 4 | 53.4321 | 5.1596 | 50.88 | 1.658441 |
| 5 | 189.7811 | (d5) | | |
| *6 | 182.9094 | 0.1500 | 38.09 | 1.553890 |
| 7 | 103.7413 | 1.2000 | 46.57 | 1.804000 |
| 8 | 14.5151 | 6.9532 | | |
| 9 | −31.1324 | 1.0000 | 39.58 | 1.804398 |
| 10 | 49.3719 | 0.1000 | | |
| 11 | 35.0000 | 4.2243 | 23.78 | 1.846660 |
| 12 | −32.7363 | 1.0764 | | |
| 13 | −20.5005 | 1.0000 | 47.38 | 1.788000 |
| 14 | −44.0388 | (d14) | | |
| 15 | ∞ | 0.5000 | (APERTURE STOP S) | |
| 16 | 40.8340 | 2.7262 | 64.19 | 1.516798 |
| 17 | −38.4648 | 0.1000 | | |
| 18 | 27.3585 | 3.2934 | 81.61 | 1.497000 |
| 19 | −32.0272 | 1.0000 | 32.35 | 1.850260 |
| 20 | −179.9291 | 3.0000 | | |
| *21 | −35.4208 | 0.1000 | 38.09 | 1.553890 |
| 22 | −35.7415 | 1.0000 | 64.10 | 1.516800 |
| 23 | 32.9221 | 1.5617 | 23.78 | 1.846660 |
| 24 | 45.6074 | 1.5000 | | |
| 25 | ∞ | (d25) | (FLARE CUT STOP) | |
| *26 | 162.6073 | 3.2000 | 64.03 | 1.516120 |
| 27 | −34.1598 | 0.5000 | | |
| 28 | 90.0000 | 2.9026 | 60.67 | 1.563839 |
| 29 | −53.8564 | 1.3000 | 32.35 | 1.850260 |
| 30 | 61.1613 | 1.3249 | | |
| 31 | −309.5498 | 3.6147 | 70.41 | 1.487490 |
| 32 | −25.1830 | (Bf) | | |

Focal lengths and moving distances of lens units f1 = 93.094
f2 = −15.473
f3 = 47.005
f4 = 44.335
Δd1 = 48.998
Δd3 = 37.545

In this third example, each lens surface of the sixth surface, the twenty first surface, and the twenty sixth surface is formed in an aspherical shape. Table 10 below provides data of the aspherical surfaces, i.e., values of the conic constant κ and the aspherical constants A4-A10 thereof.

TABLE 10

| | κ | A4 | A6 | A8 | A10 |
|---|---|---|---|---|---|
| 6th surface | 1.0000 | 1.65830E−05 | −3.43150E−08 | 5.65390E−11 | 1.12030E−13 |
| 21st surface | 8.3238 | 3.21570E−05 | 7.35370E−08 | 5.56910E−10 | 0.00000E+00 |
| 26th surface | 19.1791 | −3.00450E−05 | 0.00000E+00 | 0.00000E+00 | 0.00000E+00 |

In this third example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 11 below provides the varying spaces at respective focal lengths in the wide-angle end state, in an intermediate focal length state, and in the telephoto end state.

TABLE 11

| | WIDE ANGLE END | INTERMEDIATE FOCAL LENGTH | TELEOHOTO END |
|---|---|---|---|
| f | 18.500 | 65.000 | 105.000 |
| d5 | 2.098 | 28.005 | 39.057 |
| d14 | 27.305 | 6.199 | 1.800 |
| d25 | 6.951 | 2.079 | 1.450 |
| Bf | 38.017 | 69.944 | 81.062 |

Table 12 below shows values corresponding to the respective conditions in the third example.

TABLE 12

(1)(Lw · fw)/(Δd1 · ft) = 0.473
(2)(Lw · fw)/(Δd3 · ft) = 0.617
(3)f3/fw = 2.541
(4)f1/fw = 5.032
(5)f3/ft = 0.448
(6)f3/f4 = 1.060
(7)Bfw/fw = 2.055

Figure 10:
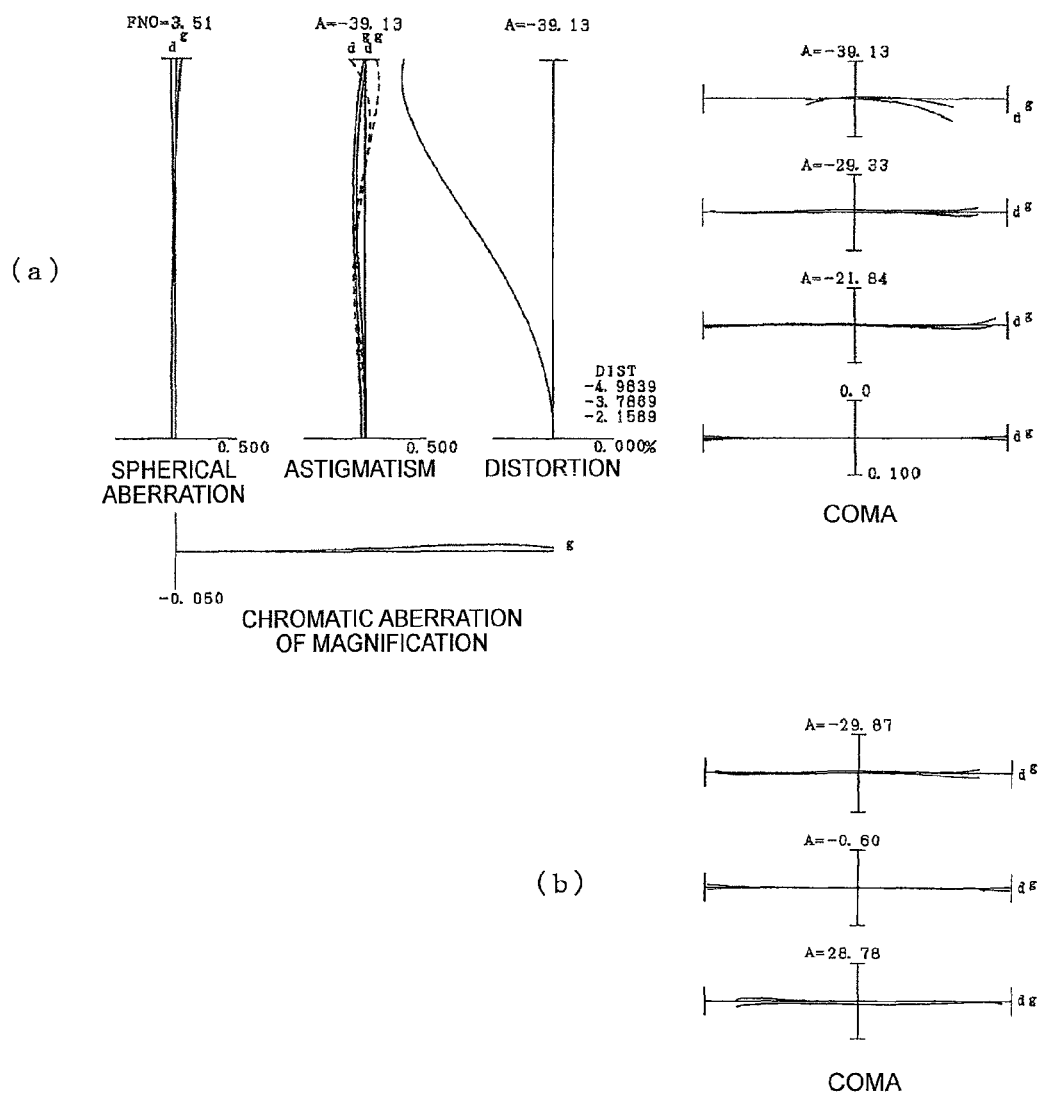
FIG. 10 is various aberration diagrams in the infinity in-focus state in the third example, wherein (a) is various aberration diagrams in the wide-angle end state and (b) coma aberration diagrams with execution of a shake compensation for a rotational deviation of 0.60° in the infinity photography state in the wide-angle end state.
Figure 11:
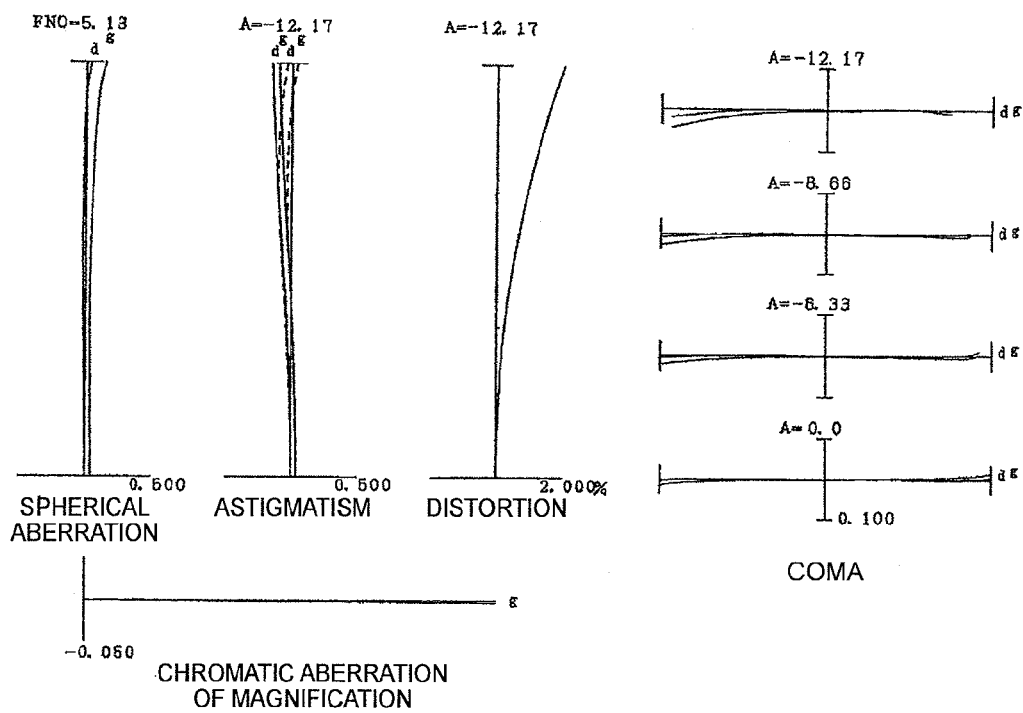
FIG. 11 is aberration diagrams in the infinity in-focus state in an intermediate focal length state in the third example.
Figure 12:
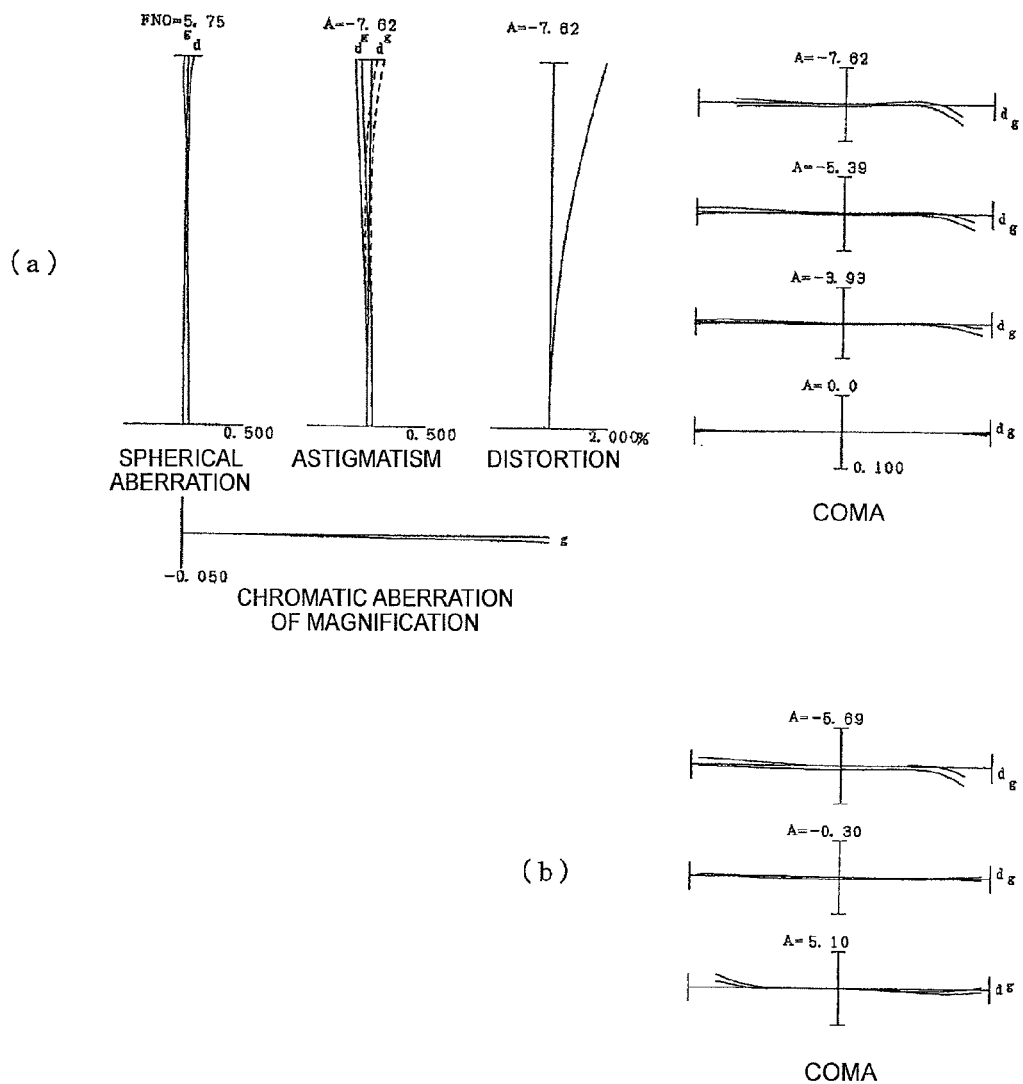
FIG. 12 is various aberration diagrams in the infinity in-focus state in the third example, wherein (a) is various aberration diagrams in the telephoto end state and (b) coma aberration diagrams with execution of a shake compensation for a rotational deviation of 0.30° in the infinity photography state in the telephoto end state.

FIG. 10 (*a*) shows aberration diagrams in the infinity in-focus state in the wide-angle end state in the third example, FIG. 11 aberration diagrams in the infinity in-focus state in the intermediate focal length state, and FIG. 12 (*a*) aberration diagrams in the infinity in-focus state in the telephoto end state. FIG. 10 (*b*) shows coma aberration diagrams with execution of the shake compensation for the rotational deviation of 0.60° in the infinity photography state in the wide-angle end state in the third example and FIG. 12 (*b*) coma aberration diagrams with execution of the shake compensation for the rotational deviation of 0.30° in the infinity photography state in the telephoto end state in the third example. As apparent from the aberration diagrams, it is seen that the optical system in the third example is well corrected for the various aberrations in each of the focal length states ranging from the wide-angle end state to the telephoto end state and has excellent imaging performance.

FOURTH EXAMPLE

Figure 13:
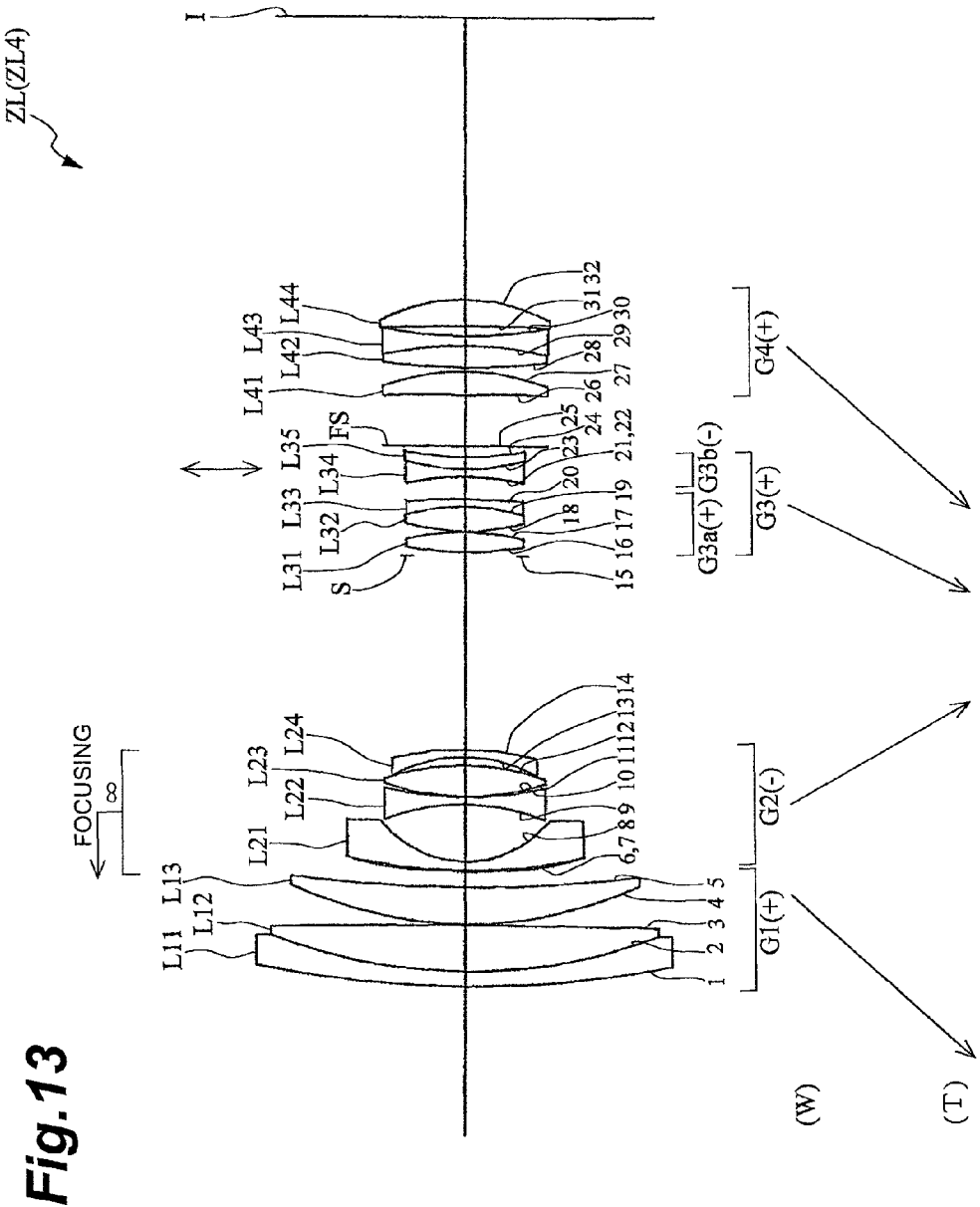
FIG. 13 is a sectional view showing a configuration of a variable power optical system according to the fourth example.

FIG. 13 is a drawing showing a configuration of a variable power optical system ZL4 according to the fourth example. In this variable power optical system ZL4 in FIG. 13, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative meniscus lens L21 with a convex surface on the object side, a negative lens L22 of a biconcave shape, a positive lens L23 of a biconvex shape, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3*a* of the third lens unit G3 is composed of, in order from the object side, a positive lens L31 of a biconvex shape, and a cemented lens of a positive lens L32 of a biconvex shape and a negative meniscus lens L33 with a concave surface on the object side. The 3b lens unit G3*b* of the third lens unit G3 is composed of, in order from the object side, a cemented lens of a negative lens L34 of a biconcave shape and a positive meniscus lens L35 with a convex surface on the object side, and the negative lens L34 of the biconcave shape located nearest to the object in the 3b lens unit G3*b* is an aspherical lens having an aspherical surface made by providing a resin layer on a glass lens surface on the object side. The fourth lens unit G4 is composed of, in order from the object side, a positive lens L41 of a biconvex shape, a cemented lens of a positive lens L42 of a biconvex shape and a negative lens L43 of a biconcave shape, and a positive meniscus lens L44 with a convex surface on the image plane side, and the positive meniscus lens L41 located nearest to the object in the fourth lens unit G4 is an aspherical lens having an object-side lens surface made in an aspherical shape.

Since the antivibration compensation factor is 1.000 and the focal length is 18.50 (mm) in the wide-angle end state in this fourth example, the moving amount of the 3b lens unit G3*b* for compensation for the rotational deviation of 0.60° is 0.194 (mm). Since the antivibration compensation factor is 1.815 and the focal length is 105.00 (mm) in the telephoto end state in this fourth example, the moving amount of the 3b lens unit G3*b* for compensation for the rotational deviation of 0.30° is 0.303 (mm).

Table 13 below provides values of specifications of the fourth example.

TABLE 13

| | WIDE ANGLE END | | INTERMEDIATE FOCAL LENGTH | | TELEOHOTO END |
|---|---|---|---|---|---|
| f = | 18.50 | ~ | 65.00 | ~ | 105.00 |
| FNO = | 3.51 | ~ | 5.10 | ~ | 5.79 |
| 2ω = | 78.26 | ~ | 24.32 | ~ | 15.24 |
| IMAGE HEIGHT = | 14.20 | ~ | 14.20 | ~ | 14.20 |
| OVERALL L LENGTH = | 131.550 | ~ | 167.168 | ~ | 186.160 |

| SURFACE NO. | RADIUS OF CURVATURE | SURFACE SEPARATION | ABBE NUMBER | REFRACTIVE INDEX |
|---|---|---|---|---|
| 1 | 141.6433 | 2.0000 | 23.78 | 1.846660 |
| 2 | 72.6601 | 6.3104 | 70.23 | 1.487490 |

TABLE 13-continued

| | | | | |
|---|---|---|---|---|
| 3 | −931.1892 | 0.1000 | | |
| 4 | 56.0747 | 4.9593 | 50.88 | 1.658441 |
| 5 | 191.8276 | (d5) | | |
| *6 | 114.9754 | 0.1500 | 38.09 | 1.553890 |
| 7 | 73.7929 | 1.2000 | 46.57 | 1.804000 |
| 8 | 14.5527 | 7.7748 | | |
| 9 | −30.0224 | 1.0000 | 39.58 | 1.804398 |
| 10 | 47.7644 | 0.1000 | | |
| 11 | 35.0000 | 4.2146 | 23.78 | 1.846660 |
| 12 | −32.9530 | 1.1617 | | |
| 13 | −19.9264 | 1.0000 | 47.38 | 1.788000 |
| 14 | −42.0535 | (d14) | | |
| 15 | ∞ | 0.5000 | (APERTURE STOP S) | |
| 16 | 44.6991 | 2.7606 | 64.19 | 1.516798 |
| 17 | −34.8394 | 0.1000 | | |
| 18 | 28.4488 | 3.3997 | 81.61 | 1.497000 |
| 19 | −28.2321 | 1.0000 | 32.35 | 1.850260 |
| 20 | −119.4787 | 3.0000 | | |
| *21 | −35.4985 | 0.1000 | 38.09 | 1.553890 |
| 22 | −35.7580 | 1.0000 | 64.10 | 1.516800 |
| 23 | 29.9881 | 1.6238 | 23.78 | 1.846660 |
| 24 | 43.5041 | 1.5000 | | |
| 25 | ∞ | (d25) | (FLARE CUT STOP) | |
| *26 | 232.2663 | 3.2000 | 64.03 | 1.516120 |
| 27 | −32.1872 | 0.5000 | | |
| 28 | 90.0000 | 2.9876 | 60.67 | 1.563839 |
| 29 | −49.4149 | 1.3000 | 32.35 | 1.850260 |
| 30 | 60.9686 | 1.3389 | | |
| 31 | −285.1808 | 3.6098 | 70.40 | 1.487490 |
| 32 | −25.0178 | (Bf) | | |

Focal lengths and moving distances of lens units f1 = 100.639
f2 = −15.490
f3 = 45.735
f4 = 45.228
Δd1 = 54.610
Δd3 = 38.792

In this fourth example, each lens surface of the sixth surface, the twenty first surface, and the twenty sixth surface is formed in an aspherical shape. Table 14 below provides data of the aspherical surfaces, i.e., values of the conic constant κ and the aspherical constants A4-A10 thereof.

TABLE 14

| | κ | A4 | A6 | A8 | A10 |
|---|---|---|---|---|---|
| 6th surface | 1.0000 | 1.52370E−05 | −2.25400E−08 | 5.16300E−12 | 2.25290E−13 |
| 21st surface | 8.6305 | 3.26180E−05 | 6.91300E−08 | 6.92310E−10 | 0.00000E+00 |
| 26th surface | −183.0712 | −2.58810E−05 | 0.00000E+00 | 0.00000E+00 | 0.00000E+00 |

In this fourth example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 15 below provides the varying spaces at respective focal lengths in the wide-angle end state, in an intermediate focal length state, and in the telephoto end state.

TABLE 15

| | WIDE ANGLE END | INTERMEDIATE FOCAL LENGTH | TELEOHOTO END |
|---|---|---|---|
| f | 18.500 | 65.000 | 105.000 |
| d5 | 2.113 | 31.473 | 42.677 |
| d14 | 26.546 | 6.189 | 1.800 |

TABLE 15-continued

| | WIDE ANGLE END | INTERMEDIATE FOCAL LENGTH | TELEOHOTO END |
|---|---|---|---|
| d25 | 6.950 | 2.036 | 1.450 |
| Bf | 38.050 | 69.578 | 82.342 |

Table 16 below shows values corresponding to the respective conditions in the fourth example.

TABLE 16

(1)(Lw · fw)/(Δd1 · ft) = 0.424
(2)(Lw · fw)/(Δd3 · ft) = 0.598
(3)f3/fw = 2.472
(4)f1/fw = 5.440
(5)f3/ft = 0.436
(6)f3/f4 = 1.011
(7)Bfw/fw = 2.057

Figure 14:
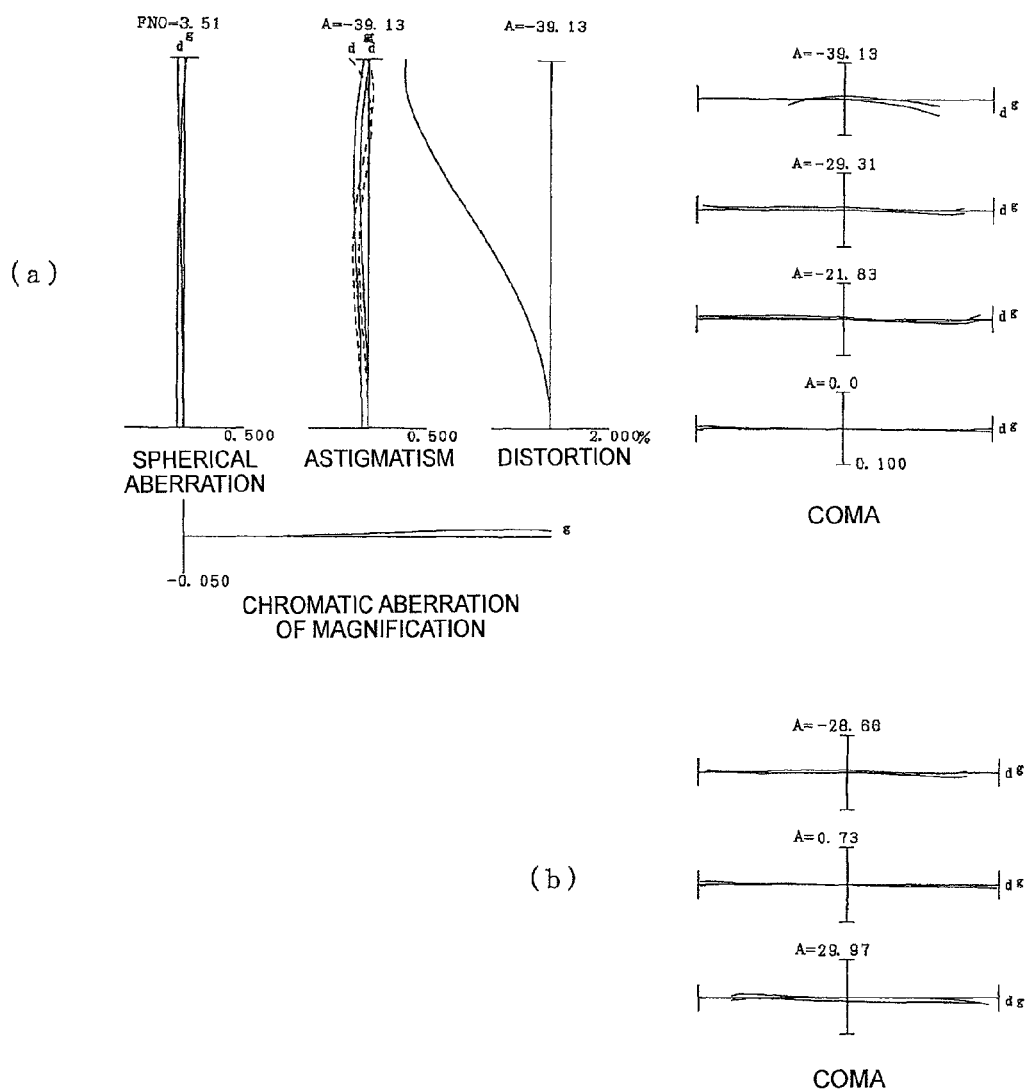
FIG. 14 is various aberration diagrams in the infinity in-focus state in the fourth example, wherein (a) is various aberration diagrams in the wide-angle end state and (b) coma aberration diagrams with execution of a shake compensation for a rotational deviation of 0.60° in the infinity photography state in the wide-angle end state.
Figure 15:
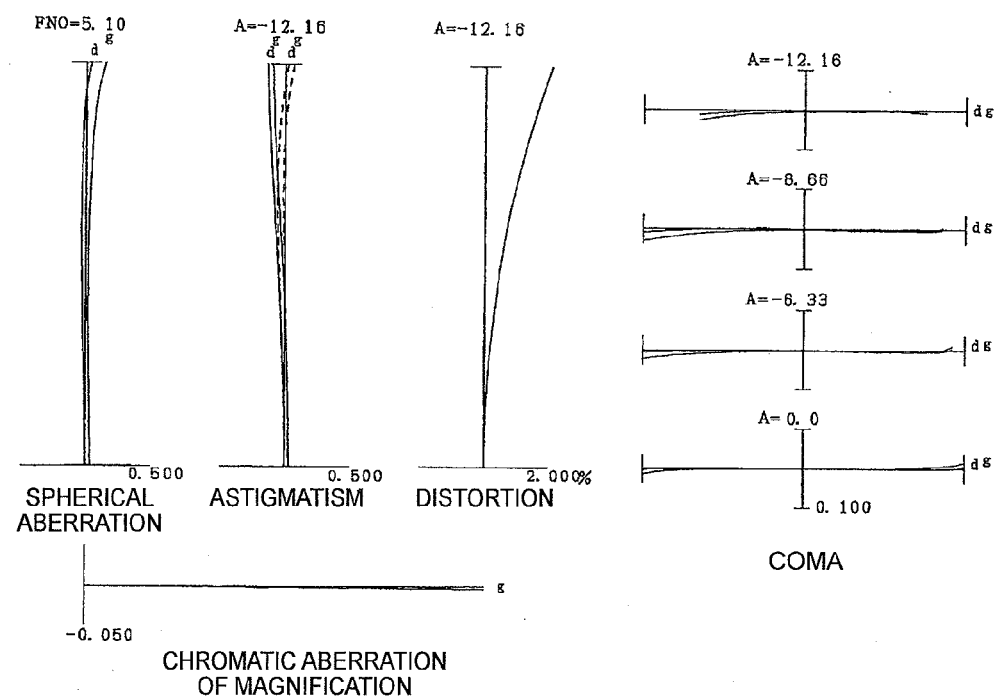
FIG. 15 is aberration diagrams in the infinity in-focus state in an intermediate focal length state in the fourth example.
Figure 16:
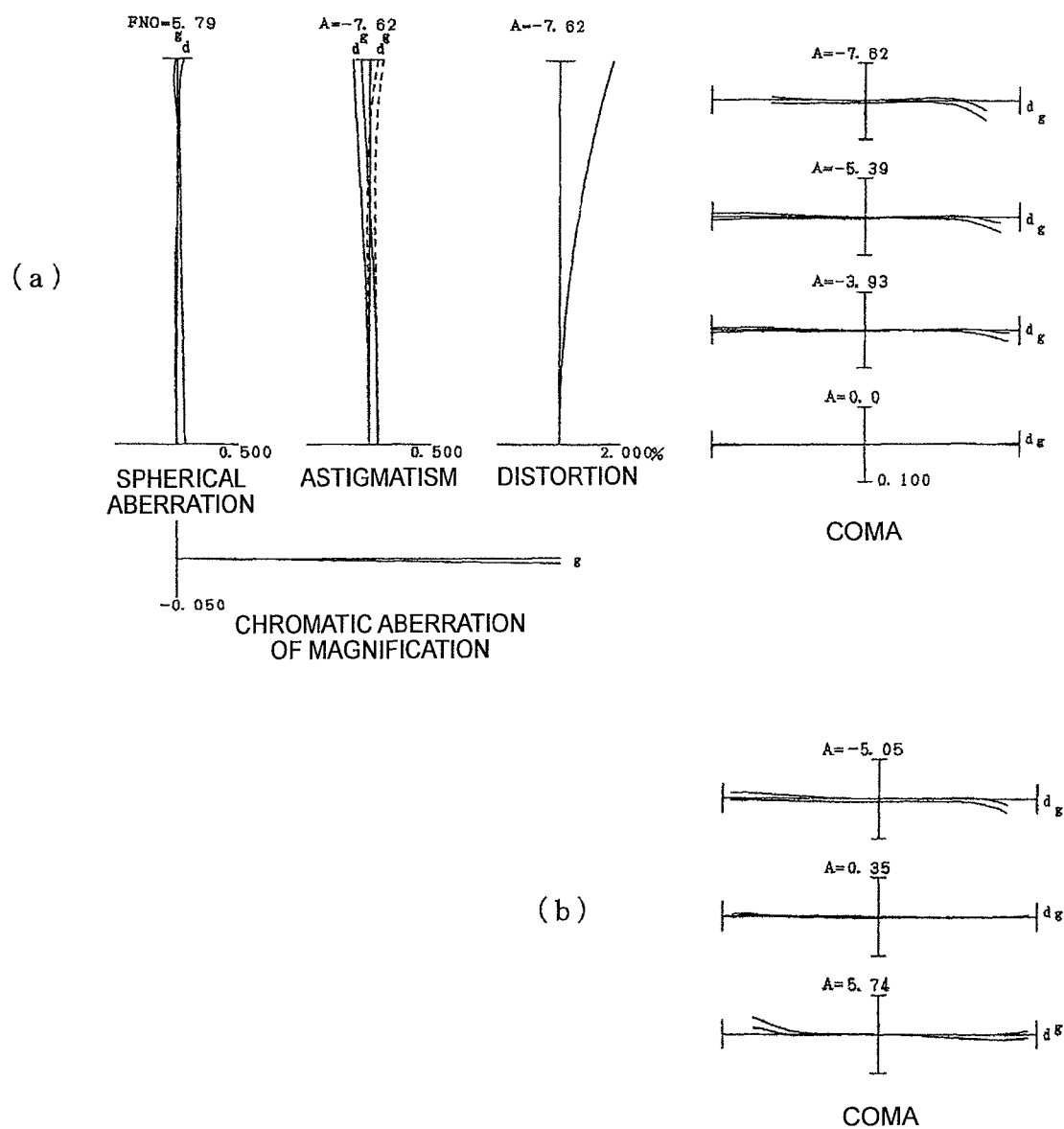
FIG. 16 is various aberration diagrams in the infinity in-focus state in the fourth example, wherein (a) is various aberration diagrams in the telephoto end state and (b) coma aberration diagrams with execution of a shake compensation for a rotational deviation of 0.30° in the infinity photography state in the telephoto end state.

FIG. 14 (a) shows aberration diagrams in the infinity in-focus state in the wide-angle end state in the fourth example, FIG. 15 aberration diagrams in the infinity in-focus state in the intermediate focal length state, and FIG. 16 (a) aberration diagrams in the infinity in-focus state in the telephoto end state. FIG. 14 (b) shows coma aberration diagrams with execution of the shake compensation for the rotational deviation of 0.60° in the infinity photography state in the wide-angle end state in the fourth example and FIG. 16 (b) coma aberration diagrams with execution of the shake compensation for the rotational deviation of 0.30° in the infinity photography state in the telephoto end state in the fourth example. As apparent from the aberration diagrams, it is seen that the optical system in the fourth example is well corrected for the various aberrations in each of the focal length states ranging from the wide-angle end state to the telephoto end state and has excellent imaging performance.

FIFTH EXAMPLE

Figure 17:
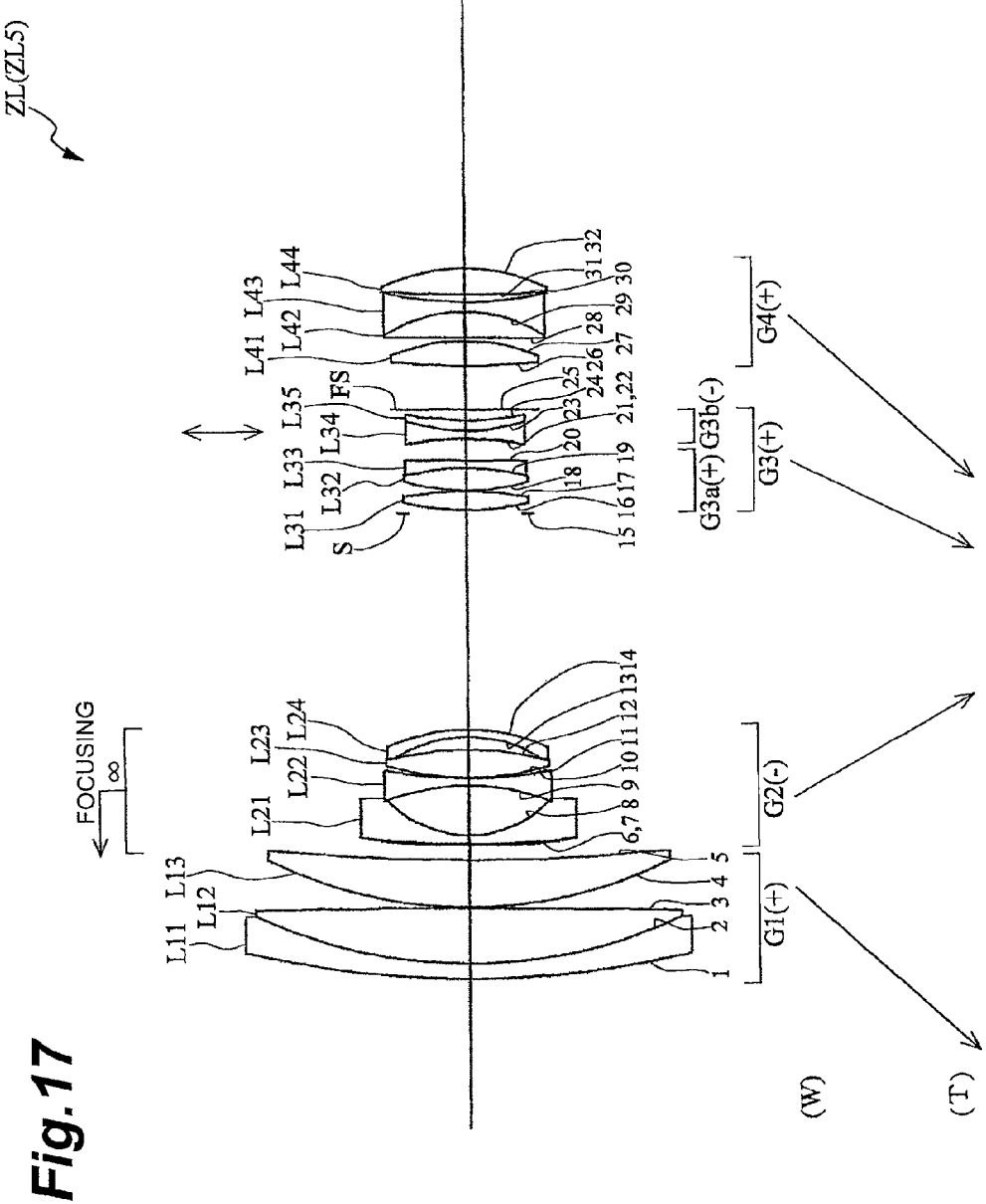
FIG. 17 is a sectional view showing a configuration of a variable power optical system according to the fifth example.

FIG. 17 is a drawing showing a configuration of a variable power optical system ZL5 according to the fifth example. In this variable power optical system ZL5 in FIG. 17, the first lens unit G1 is composed of, in order from the object side, a cemented lens of a negative meniscus lens L11 with a convex surface on the object side and a positive lens L12 of a biconvex shape, and a positive meniscus lens L13 with a convex surface on the object side. The second lens unit G2 is composed of, in order from the object side, a negative meniscus lens L21 with a convex surface on the object side, a negative lens L22 of a biconcave shape, a positive lens L23 of a biconvex shape, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3a of the third lens unit G3 is composed of, in order from the object side, a positive lens L31 of a biconvex shape, and a cemented lens of a positive lens L32 of a biconvex shape and a negative lens L33 of a biconcave shape. The 3b lens unit G3b of the third lens unit G3 is composed of, in order from the object side, a cemented lens of a negative lens L34 of a biconcave shape and a positive meniscus lens L35 with a convex surface on the object side, and the negative lens L34 of the biconcave shape located nearest to the object in the 3b lens unit G3b is an aspherical lens having an aspherical surface made by providing a resin layer on a glass lens surface on the object side. The fourth lens unit G4 is composed of, in order from the object side, a positive lens L41 of a biconvex shape, a cemented lens of a positive meniscus lens L42 with a convex surface on the image plane side and a negative lens L43 of a biconcave shape, and a positive lens L44 of a biconvex shape, and the positive lens L41 of the biconvex shape located nearest to the object in the fourth lens unit G4 is an aspherical lens having an object-side lens surface made in an aspherical shape.

Since the antivibration compensation factor is 0.999 and the focal length is 18.50 (mm) in the wide-angle end state in this fifth example, the moving amount of the 3b lens unit G3b for compensation for the rotational deviation of 0.60° is 0.194 (mm). Since the antivibration compensation factor is 1.803 and the focal length is 131.00 (mm) in the telephoto end state in this fifth example, the moving amount of the 3b lens unit G3b for compensation for the rotational deviation of 0.27° is 0.342 (mm).

Table 17 below provides values of specifications of the fifth example.

TABLE 17

|  | WIDE ANGLE END |  | INTERMEDIATE FOCAL LENGTH |  | TELEOHOTO END |
|---|---|---|---|---|---|
| f = | 18.50 | ~ | 70.00 | ~ | 131.00 |
| FNO = | 3.47 | ~ | 4.83 | ~ | 5.77 |

TABLE 17-continued

| 2ω = | 78.07 | ~ | 22.38 | ~ | 12.19 |
|---|---|---|---|---|---|
| IMAGE HEIGHT = | 14.20 | ~ | 14.20 | ~ | 14.20 |
| OVERALL L LENGTH = | 134.867 | ~ | 175.840 | ~ | 197.401 |

| SURFACE NO. | RADIUS OF CURVATURE | SURFACE SEPARATION | ABBE NUMBER | REFRACTIVE INDEX |
|---|---|---|---|---|
| 1 | 131.8145 | 2.0000 | 32.35 | 1.850260 |
| 2 | 66.7419 | 7.5709 | 81.61 | 1.497000 |
| 3 | −1267.3183 | 0.1000 | | |
| 4 | 60.4311 | 6.4106 | 65.47 | 1.603000 |
| 5 | 271.9391 | (d5) | | |
| *6 | 280.2980 | 0.1500 | 38.09 | 1.553890 |
| 7 | 116.0121 | 1.2000 | 46.63 | 1.816000 |
| 8 | 14.8328 | 6.7543 | | |
| 9 | −31.2380 | 1.0000 | 46.63 | 1.816000 |
| 10 | 55.8688 | 0.1000 | | |
| 11 | 37.6211 | 3.7843 | 23.78 | 1.846660 |
| 12 | −42.5664 | 1.8254 | | |
| 13 | −17.8616 | 1.0000 | 47.38 | 1.788000 |
| 14 | −25.2572 | (d14) | | |

TABLE 17-continued

| 15 | ∞ | 0.5000 | (APERTURE STOP S) | |
|---|---|---|---|---|
| 16 | 35.4547 | 2.5444 | 65.47 | 1.603000 |
| 17 | −49.0607 | 0.1000 | | |
| 18 | 27.6369 | 3.0607 | 81.61 | 1.497000 |
| 19 | −35.3391 | 1.0000 | 32.35 | 1.850260 |
| 20 | 849.7261 | 3.0000 | | |
| *21 | −39.3954 | 0.1000 | 38.09 | 1.553890 |
| 22 | −39.5271 | 1.0000 | 64.12 | 1.516800 |
| 23 | 25.0000 | 1.4590 | 27.51 | 1.755200 |
| 24 | 40.3853 | 1.5000 | | |
| 25 | ∞ | (d25) | (FLARE CUT STOP) | |
| *26 | 57.1912 | 3.3608 | 70.45 | 1.487490 |
| 27 | −26.1998 | 0.5000 | | |
| 28 | −31341.9590 | 3.4990 | 70.45 | 1.487490 |
| 29 | −19.9000 | 1.4000 | 44.79 | 1.744000 |
| 30 | 48.2777 | 0.9461 | | |
| 31 | 141.0745 | 3.5724 | 70.45 | 1.487490 |
| 32 | −25.6598 | (Bf) | | |

Focal lengths and moving distances of lens units f1 = 107.049
f2 = −15.981
f3 = 47.794
f4 = 47.275
Δd1 = 62.534
Δd3 = 38.119

In this fifth example, each lens surface of the sixth surface, the twenty first surface, and the twenty sixth surface is formed in an aspherical shape. Table 18 below provides data of the aspherical surfaces, i.e., values of the conic constant κ and the aspherical constants A4-A10 thereof.

TABLE 18

|  | κ | A4 | A6 | A8 | A10 |
|---|---|---|---|---|---|
| 6th surface | 1.0000 | 1.98880E−05 | −3.90400E−08 | 8.42890E−11 | 1.34030E−13 |
| 21st surface | 6.5091 | 2.30430E−05 | −1.51290E−08 | 5.59780E−10 | −2.19660E−12 |
| 26th surface | −67.0889 | 1.07570E−05 | −3.20900E−07 | 2.32710E−09 | −8.11680E−12 |

In this fifth example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 19 below provides the varying spaces at respective focal lengths in the wide-angle end state, in an intermediate focal length state, and in the telephoto end state.

TABLE 19

|  | WIDE ANGLE END | INTERMEDIATE FOCAL LENGTH | TELEOHOTO END |
|---|---|---|---|
| f | 18.500 | 69.998 | 130.995 |
| d5 | 2.070 | 41.366 | 53.610 |
| d14 | 29.519 | 9.146 | 2.394 |
| d25 | 5.843 | 1.767 | 1.000 |
| Bf | 37.997 | 64.123 | 80.959 |

Table 20 below shows values corresponding to the respective conditions in the fifth example.

TABLE 20

(1)(Lw · fw)/(Δd1 · ft) = 0.305
(2)(Lw · fw)/(Δd3 · ft) = 0.500
(3)f3/fw = 2.583
(4)f1/fw = 5.786
(5)f3/ft = 0.365
(6)f3/f4 = 1.011
(7)Bfw/fw = 2.054

Figure 18:
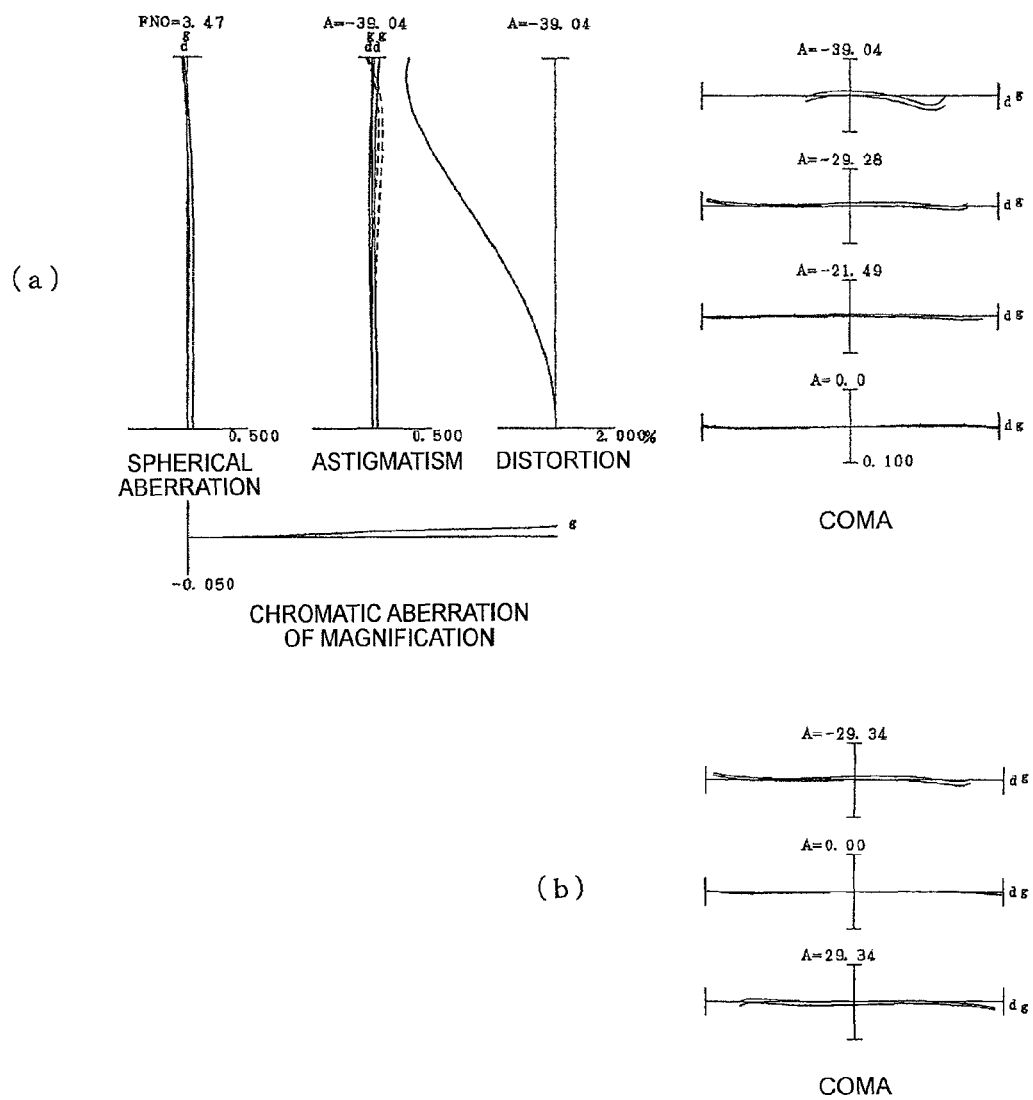
FIG. 18 is various aberration diagrams in the infinity in-focus state in the fifth example, wherein (a) is various aberration diagrams in the wide-angle end state and (b) coma aberration diagrams with execution of a shake compensation for a rotational deviation of 0.60° in the infinity photography state in the wide-angle end state.
Figure 19:
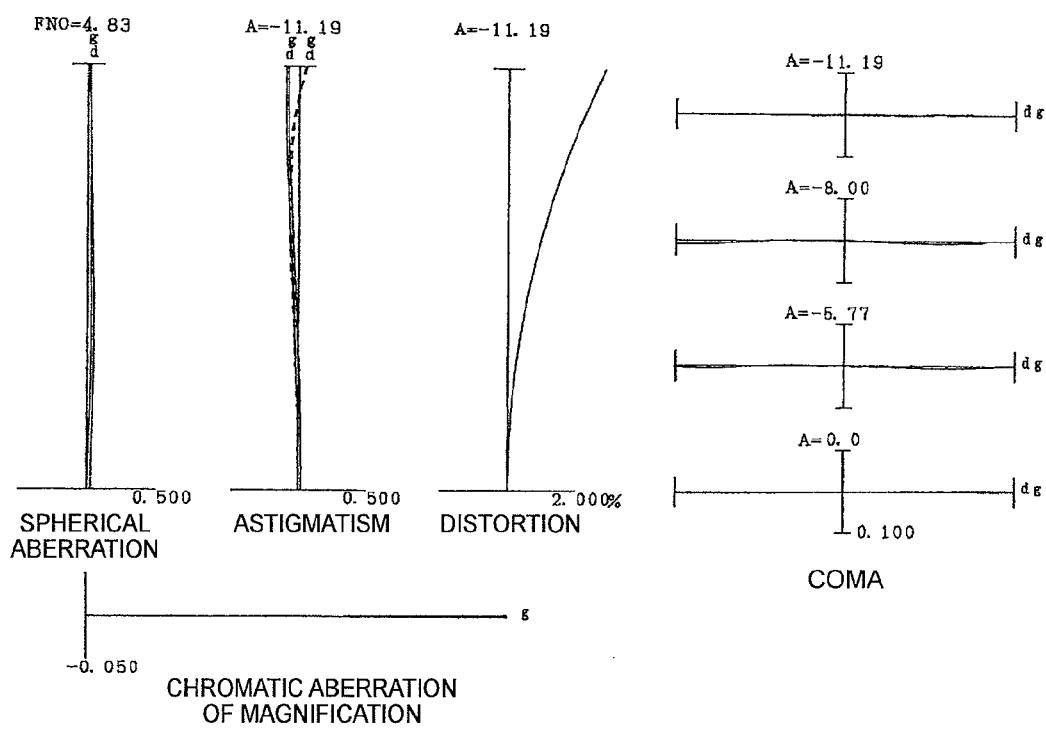
FIG. 19 is aberration diagrams in the infinity in-focus state in an intermediate focal length state in the fifth example.
Figure 20:
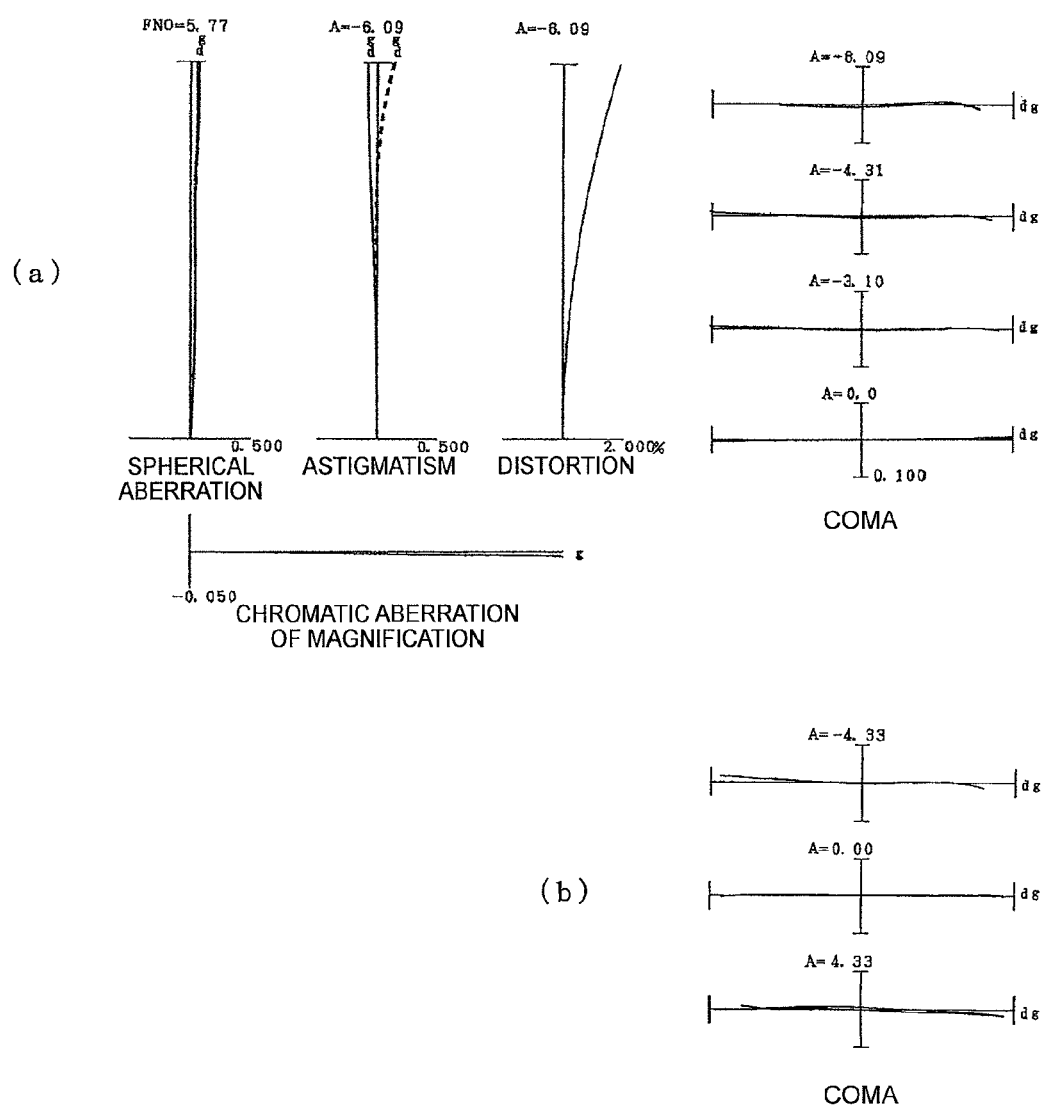
FIG. 20 is various aberration diagrams in the infinity in-focus state in the fifth example, wherein (a) is various aberration diagrams in the telephoto end state and (b) coma aberration diagrams with execution of a shake compensation for a rotational deviation of 0.27° in the infinity photography state in the telephoto end state.

FIG. 18 (a) shows aberration diagrams in the infinity in-focus state in the wide-angle end state in the fifth example, FIG. 19 aberration diagrams in the infinity in-focus state in the intermediate focal length state, and FIG. 20 (a) aberration diagrams in the infinity in-focus state in the telephoto end state. FIG. 18 (b) shows coma aberration diagrams with execution of the shake compensation for the rotational deviation of 0.60° in the infinity photography state in the wide-angle end state in the fifth example and FIG. 20 (b) coma aberration diagrams with execution of the shake compensation for the rotational deviation of 0.27° in the infinity photography state in the telephoto end state in the fifth example. As apparent from the aberration diagrams, it is seen that the optical system in the fifth example is well corrected for the various aberrations in each of the focal length states ranging from the wide-angle end state to the telephoto end state and has excellent imaging performance.

SIXTH EXAMPLE

Figure 22:
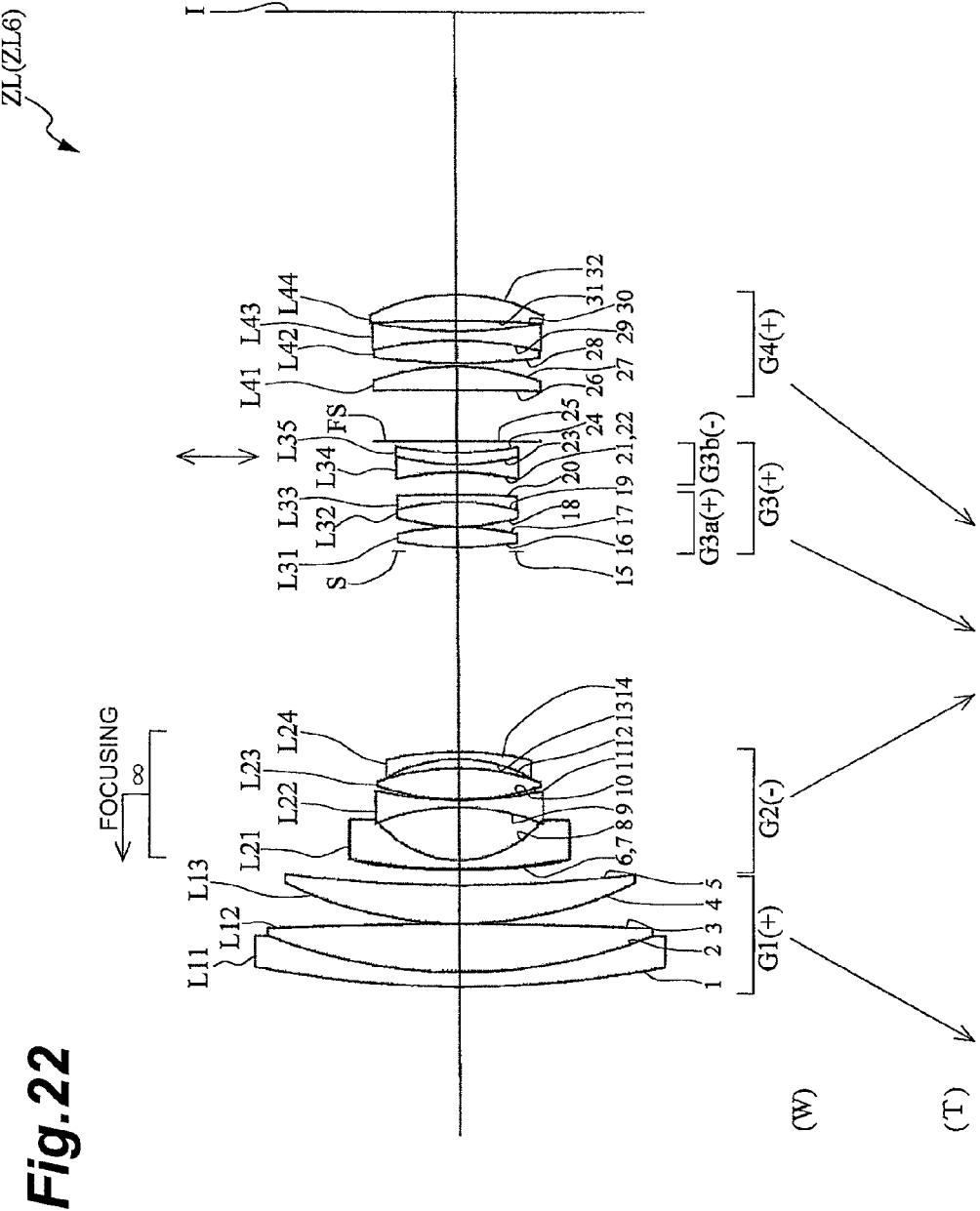
FIG. 22 is a sectional view showing a configuration of a variable power optical system according to the sixth example.

FIG. 22 is a drawing showing a configuration of a variable power optical system ZL6 according to the sixth example. In this variable power optical system ZL6 in FIG. 22, the first lens unit G1 is composed of, in order from the object side, a cemented lens of a negative meniscus lens L11 with a convex surface on the object side and a biconvex lens L12, and a positive meniscus lens L13 with a convex surface on the object side. The second lens unit G2 is composed of, in order from the object side, a negative meniscus lens L21 with a convex surface on the object side, a biconcave lens L22, a biconvex lens L23, and a negative meniscus lens L24 with a concave surface on the object side, and the negative meniscus lens L21 located nearest to the object in the second lens unit G2 is an aspherical lens having an aspherical surface made by providing a resin layer on a glass lens surface on the object side. The 3a lens unit G3a of the third lens unit G3 is composed of, in order from the object side, a biconvex lens L31 and a cemented lens of a biconvex lens L32 and a negative meniscus lens L33 with a concave surface on the object side. The 3b lens unit G3b of the third lens unit G3 is composed of, in order from the object side, a cemented lens of a biconcave lens L34 and a positive meniscus lens L35 with a convex surface on the object side, and the biconcave lens L34 located nearest to the object in the 3b lens unit G3b is an aspherical lens having an aspherical surface made by providing a resin layer on a glass lens surface on the object side. The fourth lens unit G4 is composed of, in order from the object side, a biconvex lens L41, a cemented lens of a biconvex lens L42 and a biconcave lens L43, and a positive meniscus lens L44 with a convex surface on the image plane side, and the biconvex lens L41 located nearest to the object in the fourth lens unit G4 is an aspherical lens having an object-side lens surface made in an aspherical shape.

In the case of a lens where the focal length of the entire system is f and where the antivibration compensation factor (ratio of an image moving amount on the image plane to a moving amount of a moving lens unit in the shake compensation) is K, a rotational deviation of angle θ can be corrected by moving the moving lens unit for shake compensation by (f·tan θ)/K in a direction perpendicular to the optical axis (this explanation will also apply similarly to the examples). Since the antivibration compensation factor is 0.999 and the focal length is 18.50 (mm) at the wide-angle end in this sixth example, the moving amount of the 3b lens unit G3b for compensation for the rotational deviation of 0.60° is 0.194 (mm). Since the antivibration compensation factor is 1.466 and the focal length is 105.00 (mm) at the telephoto end in this sixth example, the moving amount of the 3b lens unit G3b for compensation for the rotational deviation of 0.30° is 0.250 (mm).

Table 21 below provides values of specifications of the sixth example. In this table 21, f represents the focal length, FNO the F number, 2ω the field angle (in unit of "°"), and Bf the back focus. In addition, f1 represents the focal length of the first lens unit G1, f2 the focal length of the second lens unit G2, f3 the focal length of the third lens unit G3, f4 the focal length of the fourth lens unit G4, and Δd1 the moving distance of the first lens unit G1. Furthermore, the surface number represents an order of each lens surface from the object side along the direction of travel of rays, the surface separation an axial distance from each optical surface to a next optical surface, and the Abbe number and refractive index values for the d line (λ=587.6 nm). The units of the focal length f, radius of curvature, surface separation, and other lengths described in all the specification values below are generally "mm," but the units do not have to be limited to this unit because equivalent optical performance can also be achieved by optical systems proportionally enlarged or proportionally reduced. The radius of curvature of ∞ indicates a plane and the refractive index of air of 1.00000 is omitted. The description of these reference symbols and the description of specification tables also apply to the examples below.

TABLE 21

|  | WIDE ANGLE END |  | INTERMEDIATE FOCAL LENGTH |  | TELEOHOTO END |
| --- | --- | --- | --- | --- | --- |
| f = | 18.50 | ~ | 65.00 | ~ | 105.00 |
| FNO = | 3.50 | ~ | 5.07 | ~ | 5.75 |
| 2ω = | 78.07 | ~ | 24.23 | ~ | 15.19 |
| IMAGE HEIGHT = | 14.20 | ~ | 14.20 | ~ | 14.20 |
| OVERALL LENGTH = | 131.536 | ~ | 165.006 | ~ | 183.226 |

| SURFACE NO. | RADIUS OF CURVATURE | SURFACE SEPARATION | ABBE NUMBER | REFRACTIVE INDEX |
| --- | --- | --- | --- | --- |
| 1 | 143.2140 | 2.0000 | 23.78 | 1.846660 |
| 2 | 71.6646 | 6.4275 | 70.23 | 1.487490 |
| 3 | −618.5043 | 0.1000 |  |  |
| 4 | 53.9791 | 5.0660 | 50.88 | 1.658441 |
| 5 | 181.7249 | (d5) |  |  |
| *6 | 128.7548 | 0.1500 | 38.09 | 1.553890 |
| 7 | 82.3773 | 1.2000 | 46.57 | 1.804000 |
| 8 | 14.3017 | 7.0936 |  |  |
| 9 | −30.1601 | 1.0000 | 39.58 | 1.804398 |
| 10 | 50.9493 | 0.1000 |  |  |
| 11 | 35.0000 | 4.1886 | 23.78 | 1.846660 |
| 12 | −33.0990 | 1.2340 |  |  |
| 13 | −19.8060 | 1.0000 | 47.38 | 1.788000 |
| 14 | −41.0790 | (d14) |  |  |
| 15 | ∞ | 0.5000 | (APERTURE STOP S) |  |
| 16 | 44.3882 | 2.7436 | 64.19 | 1.516798 |
| 17 | −35.2063 | 0.1000 |  |  |
| 18 | 28.1737 | 3.3532 | 81.61 | 1.497000 |
| 19 | −29.1030 | 1.0000 | 32.35 | 1.850260 |
| 20 | −132.3158 | 3.0000 |  |  |

TABLE 21-continued

| | | | | |
|---|---|---|---|---|
| *21 | −34.8880 | 0.1000 | 38.09 | 1.553890 |
| 22 | −35.1681 | 1.0000 | 64.10 | 1.516800 |
| 23 | 30.9424 | 1.6084 | 23.78 | 1.846660 |
| 24 | 44.7542 | 1.5000 | | |
| 25 | ∞ | (d25) | (FLARE CUT STOP) | |
| *26 | 225.3925 | 3.2000 | 64.03 | 1.516120 |
| 27 | −32.3199 | 0.5000 | | |
| 28 | 90.0000 | 2.9457 | 60.67 | 1.563839 |
| 29 | −51.4023 | 1.3000 | 32.35 | 1.850260 |
| 30 | 60.8086 | 1.3435 | | |
| 31 | −282.7585 | 3.6108 | 70.41 | 1.487490 |
| 32 | −25.0000 | (Bf) | | |

Focal lengths and moving distances of lens units f1 = 96.633
f2 = −15.521
f3 = 46.345
f4 = 44.900
Δd1 = 51.690

In this sixth example, each lens surface of the sixth surface, the twenty first surface, and the twenty sixth surface is formed in an aspherical shape. Table 22 below provides data of the aspherical surfaces, i.e., values of the conic constant κ and the aspherical constants A4-A10 thereof.

TABLE 22

| | κ | A4 | A6 | A8 | A10 |
|---|---|---|---|---|---|
| 6th surface | 1.0000 | 1.61870E−05 | −2.58870E−08 | 6.80330E−12 | 2.69690E−13 |
| 21st surface | 7.3084 | 2.99250E−05 | 6.09890E−08 | 4.01930E−10 | 0.00000E+00 |
| 26th surface | −186.0392 | −2.61280E−05 | 0.00000E+00 | 0.00000E+00 | .00000E+00 |

In this sixth example, the following spaces vary during zooming: axial air space d5 between the first lens unit G1 and the second lens unit G2; axial air space d14 between the second lens unit G2 and the third lens unit G3; axial air space d25 between the third lens unit G3 and the fourth lens unit G4; and the back focus Bf. Table 23 below provides the varying spaces at respective focal lengths in the wide-angle end state, in an intermediate focal length state, and in the telephoto end state.

TABLE 23

| | WIDE ANGLE END | INTERMEDIATE FOCAL LENGTH | TELEOHOTO END |
|---|---|---|---|
| f | 18.500 | 65.000 | 105.000 |
| d5 | 2.110 | 30.024 | 40.623 |
| d14 | 27.055 | 6.330 | 1.800 |
| d25 | 6.970 | 2.042 | 1.450 |
| Bf | 38.036 | 69.245 | 81.987 |

Table 24 below shows values corresponding to the respective conditions in the sixth example. In this Table 24, Lw represents the overall length in the wide-angle end state, fw the focal length of the entire system in the wide-angle end state, Δd1 the axial moving distance of the first lens unit G1 during the change in the lens position state from the wide-angle end state to the telephoto end state, ft the focal length of the entire system in the telephoto end state, f1 the focal length of the first lens unit G1, f3 the focal length of the third lens unit G3, f4 the focal length of the fourth lens unit G4, and Bfw the back focus in the wide-angle end state. This description of reference symbols also applies to the examples below.

TABLE 24

(1)(Lw · fw)/(Δd1 · ft) = 0.448
(2)f3/fw = 2.505
(3)f1/fw = 5.223
(4)f3/ft = 0.441
(5)f3/f4 = 1.032
(6)Bfw/fw = 2.056

Figure 23:
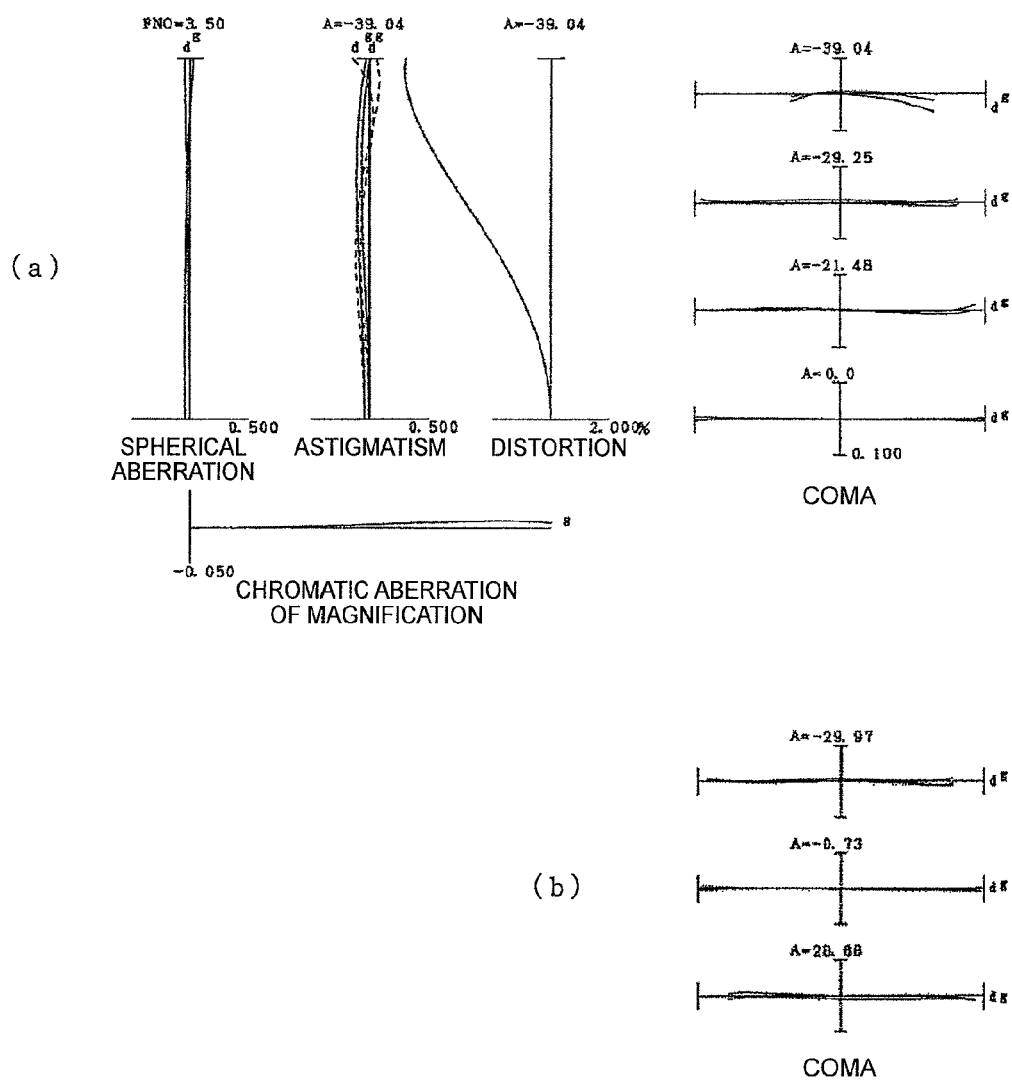
FIG. 23 is various aberration diagrams in the infinity in-focus state in the sixth example, wherein (a) is various aberration diagrams in the wide-angle end state and (b) coma aberration diagrams with execution of a shake compensation for a rotational deviation of 0.60° in the infinity photography state in the wide-angle end state.
Figure 24:
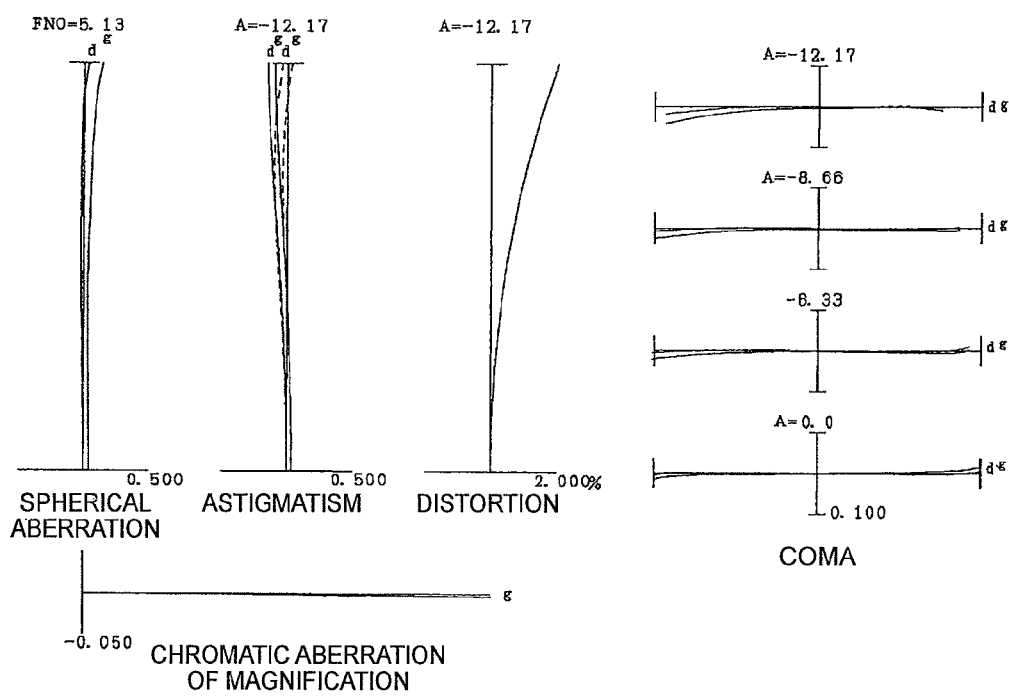
FIG. 24 is aberration diagrams in the infinity in-focus state in an intermediate focal length state in the sixth example.
Figure 25:
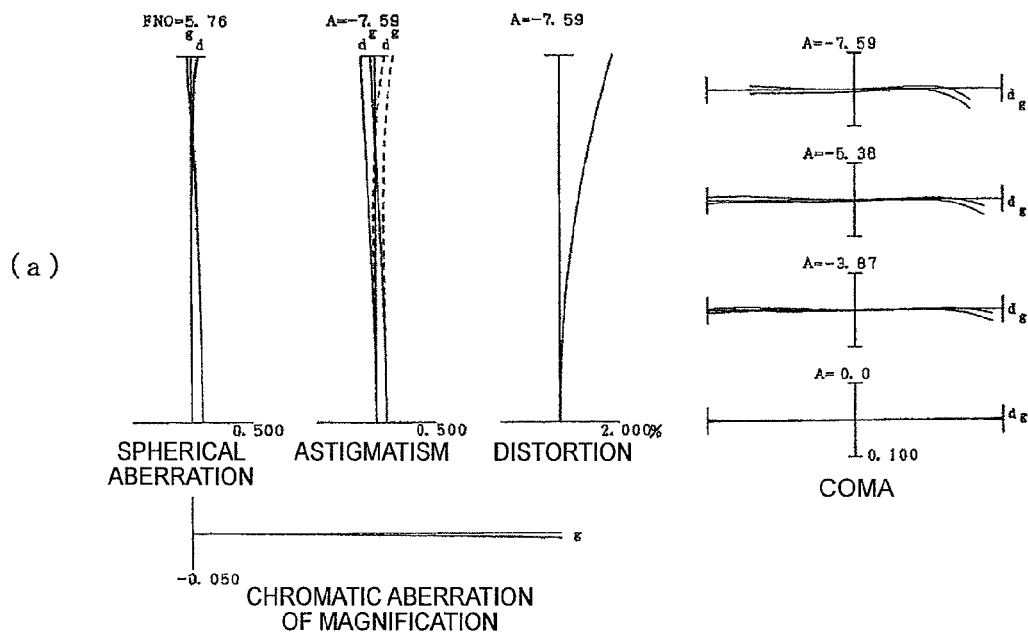
FIG. 25 is various aberration diagrams in the infinity in-focus state in the sixth example, wherein (a) is various aberration diagrams in the telephoto end state and (b) coma aberration diagrams with execution of a shake compensation for a rotational deviation of 0.30° in the infinity photography state in the telephoto end state.

FIG. 23 (a) shows aberration diagrams in the infinity in-focus state in the wide-angle end state in the sixth example, FIG. 24 aberration diagrams in the infinity in-focus state in the intermediate focal length state, and FIG. 25 (a) aberration diagrams in the infinity in-focus state in the telephoto end state. FIG. 23 (b) shows coma aberration diagrams with execution of the shake compensation for the rotational deviation of 0.60° in the infinity photography state in the wide-angle end state in the sixth example and FIG. 25 (b) coma aberration diagrams with execution of the shake compensation for the rotational deviation of 0.30° in the infinity photography state in the telephoto end state in the sixth example.

In each aberration diagram, FNO indicates the F number, A a half field angle (in unit of "°"), d the d-line (λ=587.6 nm), and g the g line (λ=435.6 nm). In the spherical aberration diagrams the F number is a value corresponding to a maximum aperture; in each of the astigmatism aberration diagrams and distortion aberration diagrams a maximum field angle is shown; in the coma aberration diagrams there are values at respective field angles shown. In the astigmatism aberration diagrams a solid line represents a sagittal image surface and a dashed line a meridional image surface. Furthermore, in the spherical aberration diagrams, a solid line represents spherical aberration. The description of the aberration diagrams will also apply to the examples. As apparent from the aberration diagrams, it is seen that the optical system in the sixth example is well corrected for the various aberrations in each of the focal length states ranging from the wide-angle end state to the telephoto end state and has excellent imaging performance.

INDUSTRIAL APPLICABILITY

The present invention is applicable to the variable power optical systems capable of achieving excellent optical performance.

The invention claimed is:
1. A variable power optical system comprising, in order from the object side:
a first lens unit having a positive refractive power;
a second lens unit having a negative refractive power;
a third lens unit having a positive refractive power; and
a fourth lens unit having a positive refractive power,
wherein during variation in power from a wide-angle end state to a telephoto end state, a space between the first lens unit and the second lens unit increases, a space between the second lens unit and the third lens unit decreases, and a space between the third lens unit and the fourth lens unit varies, wherein a part of the third lens unit is configured to move in directions perpendicular to the optical axis, the variable power optical system satisfying conditions of the following expressions:

$$0.25 < (Lw \cdot fw)/(\Delta d1 \cdot ft) < 0.55;$$

$$2.20 < f3/fw < 4.50,$$

where fw is a focal length of the entire system in the wide-angle end state, ft a focal length of the entire system in the telephoto end state, f3 a focal length of the third lens unit, $\Delta d1$ an axial moving distance of the first lens unit upon zooming from a wide-angle end state to a telephoto end state, and Lw an overall length in the wide-angle end state.

2. The variable power optical system according to claim 1, satisfying a condition of the following expression:

$$0.42 < (Lw \cdot fw)/(\Delta d3 \cdot ft) < 0.90,$$

where $\Delta d3$ is an axial moving distance of the third lens unit during the variation in power from the wide-angle end state to the telephoto end state.

3. The variable power optical system according to claim 1, wherein the third lens unit comprises, in order from the object side, a 3a lens unit having a positive refractive power and a 3b lens unit having a negative refractive power, and wherein the 3b lens unit is configured to move in directions perpendicular to the optical axis.

4. The variable power optical system according to claim 1, satisfying a condition of the following expression:

$$3.50 < f1/fw < 8.00,$$

where f1 is a focal length of the first lens unit.

5. The variable power optical system according to claim 1, wherein upon zooming from a wide-angle end state to a telephoto end state, the third lens unit and the fourth lens unit move toward an object.

6. The variable power optical system according to claim 1, wherein upon zooming from a wide-angle end state to a telephoto end state, the first lens unit moves toward an object.

7. The variable power optical system according to claim 1, satisfying a condition of the following expression:

$$0.30 < f3/ft < 1.00,$$

where f3 is the focal length of the third lens unit and ft the focal length of the entire system in the telephoto end state.

8. The variable power optical system according to claim 1, which is configured so that the space between the third lens unit and the fourth lens unit in the wide-angle end state becomes larger than the space between the third lens unit and the fourth lens unit in the telephoto end state.

9. The variable power optical system according to claim 1, satisfying conditions of the following expressions:

$$0.80 < f3/f4 < 1.60;$$

$$1.90 < Bfw/fw < 3.00,$$

where f4 is a focal length of the fourth lens unit and Bfw a back focus in the wide-angle end state.

10. The variable power optical system according to claim 1, wherein the 3b lens unit is composed of, in order from the object side, a cemented lens in which a biconcave lens and a positive meniscus lens with a convex surface on the object side are cemented together.

11. The variable power optical system according to claim 1, wherein a lens surface nearest to the object in the 3b lens unit is formed in an aspherical shape.

12. An optical apparatus comprising the variable power optical system as set forth in claim 1.

13. A variable power optical system comprising, in order from the object side:

a first lens unit having a positive refractive power;
a second lens unit having a negative refractive power;
a third lens unit having a positive refractive power; and
a fourth lens unit having a positive refractive power,
wherein upon zooming from a wide-angle end state to a telephoto end state, a space between the first lens unit and the second lens unit increases, a space between the second lens unit and the third lens unit decreases, and a space between the third lens unit and the fourth lens unit varies,
wherein a part of the third lens unit is configured to move in directions perpendicular to the optical axis,
the variable power optical system satisfying conditions of the following expressions:

$$0.15 < (Lw \cdot fw)/(\Delta d1 \cdot ft) < 0.58;$$

$$0.42 < (Lw \cdot fw)/(\Delta d3 \cdot ft) < 0.90;$$

$$2.20 < f3/fw < 4.50,$$

where fw is a focal length of the entire system in the wide-angle end state, ft a focal length of the entire system in the telephoto end state, f3 a focal length of the third lens unit, $\Delta d1$ an axial moving distance of the first lens unit upon zooming from a wide-angle end state to a telephoto end state, $\Delta d3$ an axial moving distance of the third lens unit during the change in the lens position state from the wide-angle end state to the telephoto end state, and Lw an overall length in the wide-angle end state.

14. A method for manufacturing a variable power optical system, comprising:

a step of arranging, in order from the object side, a first lens unit having a positive refractive power, a second lens unit having a negative refractive power, a third lens unit having a positive refractive power, and a fourth lens unit having a positive refractive power so that a part of the third lens unit moves in directions perpendicular to the optical axis; and a step of increasing a space between the first lens unit and the second lens unit, decreasing a space between the second lens unit and the third lens unit, and varying a space between the third lens unit and the fourth lens unit, thereby implementing variation in power from a wide-angle end state to a telephoto end state, the variable power optical system satisfying conditions of the following expressions:

$$0.25 < (Lw \cdot fw)/(\Delta d1 \cdot ft) < 0.55;$$

$$2.20 < f3/fw < 4.50,$$

where fw is a focal length of the entire system in the wide-angle end state, ft a focal length of the entire system in the telephoto end state, f3 a focal length of the third lens unit, $\Delta d1$ an axial moving distance of the first lens unit during change in a lens position state from the wide-angle end state to the telephoto end state, and Lw an overall length in the wide-angle end state.

* * * * *